(12) United States Patent
Martin et al.

(10) Patent No.: US 11,399,296 B2
(45) Date of Patent: Jul. 26, 2022

(54) COMMUNICATIONS DEVICES, INFRASTRUCTURE EQUIPMENT AND METHODS

(71) Applicant: Sony Corporation, Tokyo (JP)

(72) Inventors: Brian Alexander Martin, Basingstoke (GB); Yuxin Wei, Basingstoke (GB); Hideji Wakabayashi, Basingstoke (GB); Shinichiro Tsuda, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/101,774

(22) Filed: Nov. 23, 2020

(65) Prior Publication Data
US 2021/0076235 A1    Mar. 11, 2021

Related U.S. Application Data

(63) Continuation of application No. 16/323,262, filed as application No. PCT/EP2017/068401 on Jul. 20, 2017, now Pat. No. 10,848,993.

(30) Foreign Application Priority Data

Aug. 12, 2016    (EP) .................................... 16184065

(51) Int. Cl.
*H04W 24/04* (2009.01)
*H04W 76/19* (2018.01)
(Continued)

(52) U.S. Cl.
CPC ........... *H04W 24/04* (2013.01); *H04W 16/32* (2013.01); *H04W 36/0069* (2018.08);
(Continued)

(58) Field of Classification Search
CPC . H04W 36/0085; H04W 36/14; H04W 76/15; H04W 36/0079; H04W 24/04;
(Continued)

(56) References Cited

U.S. PATENT DOCUMENTS 8,351,922 B2 *  1/2013  Wang .................... H04B 17/318
                                            370/335
8,369,228 B2 *  2/2013  Cave ...................... H04W 24/00
                                            370/278

(Continued)

FOREIGN PATENT DOCUMENTS

WO    2010/105148 A1    9/2010

OTHER PUBLICATIONS

Holma et al., "LTE for UMTS OFDMA and SC-FDMA Based Radio Access", System Architecture based on 3GPP SAE, ISBN 978-0-470-99401-6, Wiley 2009, 11 pages.
(Continued)

*Primary Examiner* — Man U Phan
(74) *Attorney, Agent, or Firm* — Xsensus, LLP

(57) ABSTRACT

Methods of communicating in a wireless telecommunications system comprising a communications device, a master cell group comprising one or more infrastructure equipment of a first type and a secondary cell group comprising one or more infrastructure equipment of a second type, the communications device being in a coverage area of one of the infrastructure equipment of the first type and a coverage area of at least one of the infrastructure equipment of the second type, wherein the communications device is configured to transmit signals to and receive signals from the infrastructure equipment of the first type in accordance with a first communications protocol and to transmit signals to and receive signals from the at least one infrastructure equip-
(Continued)

ment of the second type in accordance with a second communications protocol, the second communications protocol being different to the first communications protocol. A method according to a first example embodiment of the present disclosure comprises establishing a measurement of radio conditions associated with a first communications path between the communications device and the infrastructure equipment of the first type, determining that the first communications path is not appropriate for use by the communications device, transmitting a failure message from the communications device to one of the infrastructure equipment of the second type via a second communications path, the failure message providing information regarding the determination that the first communications path is not appropriate for use by the communications device, receiving at the communications device a signal comprising a reconfiguration message from the one of the infrastructure equipment of the second type via the second communications path, and establishing, using the reconfiguration message, signals to be transmitted by the communications device and signals to be received by the communications device. The determining that the first communications path is not appropriate for use by the communications device comprises detecting, from the measurement of radio conditions, radio link failure on the first communications path. A method according to a second example embodiment of the present disclosure comprising establishing a first measurement of radio conditions associated with a first communications path between the communications device and the infrastructure equipment of the first type, the first measurement of radio conditions comprising a quality of the first communications path, determining that the quality of the first communications path is below a first predetermined threshold, initiating a timer, the timer being configured to expire after a predetermined amount of time, establishing a second measurement of radio conditions associated with a second communications path between the communications device and one of the infrastructure equipment of the second type, the second measurement of radio conditions comprising a quality of the second communications path, determining that the quality of the second communications path is below a second predetermined threshold, terminating the timer before the predetermined amount of time has elapsed, receiving at the communications device a signal comprising a re-establishment command, and establishing that, using the re-establishment command, the communications device should transmit signals to and receive signals from a second infrastructure equipment of the first type via a third communications path.

11 Claims, 13 Drawing Sheets

(51) Int. Cl.
*H04W 36/30* (2009.01)
*H04W 16/32* (2009.01)
*H04W 36/00* (2009.01)
*H04W 76/15* (2018.01)
*H04W 36/14* (2009.01)

(52) U.S. Cl.
CPC ..... *H04W 36/0085* (2018.08); *H04W 36/305* (2018.08); *H04W 76/15* (2018.02); *H04W 76/19* (2018.02); *H04W 36/0079* (2018.08); *H04W 36/14* (2013.01)

(58) Field of Classification Search
CPC . H04W 16/32; H04W 76/19; H04W 36/0069; H04W 36/305; H04W 36/30; H04W 36/00
USPC .......................................................... 370/225
See application file for complete search history.

(56) References Cited

U.S. PATENT DOCUMENTS

| | | | |
|---|---|---|---|
| 8,488,443 B2* | 7/2013 | Lee | H04L 5/0007 370/242 |
| 9,042,315 B2* | 5/2015 | Lin | H04L 5/001 370/242 |
| 9,510,386 B2* | 11/2016 | Marinier | H04W 24/08 |
| 9,894,702 B2* | 2/2018 | Mishra | H04W 36/08 |
| 10,271,232 B2* | 4/2019 | Marinier | H04L 5/001 |
| 10,476,636 B2* | 11/2019 | Yi | H04W 76/28 |
| 10,575,204 B2* | 2/2020 | Lee | H04W 56/0005 |
| 2008/0019279 A1* | 1/2008 | Kim | H04L 1/0061 370/241 |
| 2012/0281548 A1 | 11/2012 | Lin et al. | |
| 2013/0095818 A1* | 4/2013 | Levy | H04B 17/318 455/423 |
| 2016/0112924 A1* | 4/2016 | Turakhia | H04W 36/305 370/332 |

OTHER PUBLICATIONS

Mediatek Inc., "Performance of Control Plane Diversity", 3GPP TSG-RAN2 #83 Meeting R2-132469, Barcelona, Spain, Aug. 19-23, 2013, pp. 1-9.

3GPP, "Technical Specification Group Radio Access Network; Evolved Universal Terrestrial Radio Access (E-UTRA) and Evolved Universal Terrestrial Radio Access Network (E-UTRAN)", Stage 2, 3GPP TS 36.300 version 8.12.0 Release 8, Mar. 2010, pp. 1-149.

3GPP, "Technical Specification Group Radio Access Network; Evolved Universal Terrestrial Radio Access (E-UTRA); Study on Small Cell Enhancements for E-UTRA and E-UTRAN", 3GPP TR 36.842 version 1.0.0 Release 12, Nov. 2013, pp. 1-68.

Ericsson, "Tight integration of the New Radio interface (NR) and LTE: Control Plane design", 3GPP TSG-RAN WG2 #93bis Tdoc R2-162753, Dubrovnik, Croatia, Apr. 11-15, 2016, pp. 1-5.

KT Corp., "RAN interworking between NR and LTE", 3GPP TSG-RAN WG2 Meeting #93bis R2-162965, Dubrovnik, Croatia, Apr. 11-15, 2016, pp. 1-2.

Qualcomm Incorporated, "RLF recovery enhancements", 3GPP TSG-RAN WG2 Meeting No. 82 R2-131663 Fukuoka, Japan, May 20-24, 2013, 5 pages.

International Search Report dated Oct. 23, 2017 for PCT/EP2017/068401 filed on Jul. 20, 2017, 11 pages.

* cited by examiner

1) NR is connected to NextGen Core

1) NR and LTE stand-alone

2) NR and LTE stand-alone anchored to NextGen Core

COMMUNICATIONS DEVICES, INFRASTRUCTURE EQUIPMENT AND METHODS

This application is a continuation of U.S. application Ser. No. 16/323,262 filed Feb. 5, 2019, now issued as U.S. Pat. No. 10,848,993 which is based on PCT tiling PCT/EP2017/068401 filed Jul. 20, 2017 and claims priority to EP 16184065.7 filed Aug. 12, 2016, the entire contents of each are incorporated herein by reference.

BACKGROUND

Field of Disclosure

The present disclosure relates to methods of communicating in wireless telecommunications systems comprising infrastructure equipment of a first type and infrastructure equipment of a second type, and specifically to methods of recovering from radio link failure. The present disclosure also relates to communications devices and infrastructure equipment forming part of such wireless telecommunication systems.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation mobile telecommunication systems, such as those based on the $3^{rd}$ Generation Partnership Project (3GPP) defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

However, whilst fourth generation networks can support communications at high data rate and low latencies from devices such as smart phones and tablet computers, it is expected that future wireless communications networks, will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio (NR) system/new radio access technology (RAT), networks, to efficiently support connectivity for a wide range of devices associated with different applications with different characteristic data traffic profiles, resulting in different devices have different operating characteristics/requirements, such as:
High latency tolerance
High data rates
Millimetre wave spectrum use
High density of network nodes (e.g. small cell and relay nodes)
Large system capacity
Large numbers of devices (e.g. MTC devices/Internet of Things devices)
High reliability (e.g. for vehicle safety applications, such as self-driving cars).
Low device cost and energy consumption
Flexible spectrum usage
Flexible mobility The introduction of new radio access technology (RAT) systems/networks therefore gives rise to new challenges for providing efficient operation for devices operating in new RAT networks, including devices able to operate in both new RAT networks (e.g. a 3GPP 5G network) and currently deployed RAT networks (e.g. a 3GPP 4G or LTE network). One particular area where new approaches may be helpful is in relation to radio link failure (RLF) on a radio link between a UE and an eNodeB, where the eNodeB may be part of a 4G/LTE system or a 5G/new RAT system.

Indeed, in a wireless telecommunications system where a UE may have a connection to both a 4G eNodeB and a 5G eNodeB, there is a particular desire to provide ways in which a RLF of the link to one of those eNodeBs will be adequately handled.

SUMMARY OF THE DISCLOSURE

According to a first example embodiment of the present disclosure, there is provided a method of communicating in a wireless telecommunications system comprising a communications device, a master cell group comprising one or more infrastructure equipment of a first type and a secondary cell group comprising one or more infrastructure equipment of a second type, the communications device being in a coverage area of one of the infrastructure equipment of the first type and a coverage area of at least one of the infrastructure equipment of the second type, wherein the communications device is configured to transmit signals to and receive signals from the infrastructure equipment of the first type in accordance with a first communications protocol and to transmit signals to and receive signals from the at least one infrastructure equipment of the second type in accordance with a second communications protocol, the second communications protocol being different to the first communications protocol. The method comprises establishing a measurement of radio conditions associated with a first communications path between the communications device and the infrastructure equipment of the first type, determining that the first communications path is not appropriate for use by the communications device, transmitting a failure message from the communications device to one of the infrastructure equipment of the second type via a second communications path, the failure message providing information regarding the determination that the first communications path is not appropriate for use by the communications device, receiving at the communications device a signal comprising a reconfiguration message from the one of the infrastructure equipment of the second type via the second communications path, and establishing, using the reconfiguration message, signals to be transmitted by the communications device and signals to be received by the communications device. The determining that the first communications path is not appropriate for use by the communications device comprises detecting, from the measurement of radio conditions, radio link failure on the first communications path.

According to a second example embodiment of the present disclosure, there is provided a method of communicating in a wireless telecommunications system comprising a communications device, a master cell group comprising a plurality of infrastructure equipment of a first type and a secondary cell group comprising one or more infrastructure equipment of a second type, the communications device being in a coverage area of one of the infrastructure equipment of the first type and a coverage area of at least one of the infrastructure equipment of the second type, wherein the communications device is configured to transmit signals to and receive signals from the infrastructure equipment of the first type in accordance with a first communications protocol and to transmit signals to and receive signals from the at least one infrastructure equipment of the second type in accordance with a second communications protocol, the second communications protocol being different to the first communications protocol. The method comprising establishing a first measurement of radio conditions associated with a first communications path between the communications device and the infrastructure equipment of the first type, the first measurement of radio conditions comprising a quality of the first communications path, determining that the quality of the first communications path is below a first predetermined threshold, initiating a timer, the timer being configured to expire after a predetermined amount of time, establishing a second measurement of radio conditions associated with a second communications path between the communications device and one of the infrastructure equipment of the second type, the second measurement of radio conditions comprising a quality of the second communications path, determining that the quality of the second communications path is below a second predetermined threshold, terminating the timer before the predetermined amount of time has elapsed, receiving at the communications device a signal comprising a re-establishment command, and establishing that, using the re-establishment command, the communications device should transmit signals to and receive signals from a second infrastructure equipment of the first type via a third communications path.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

LTE Communications System

Figure 1:
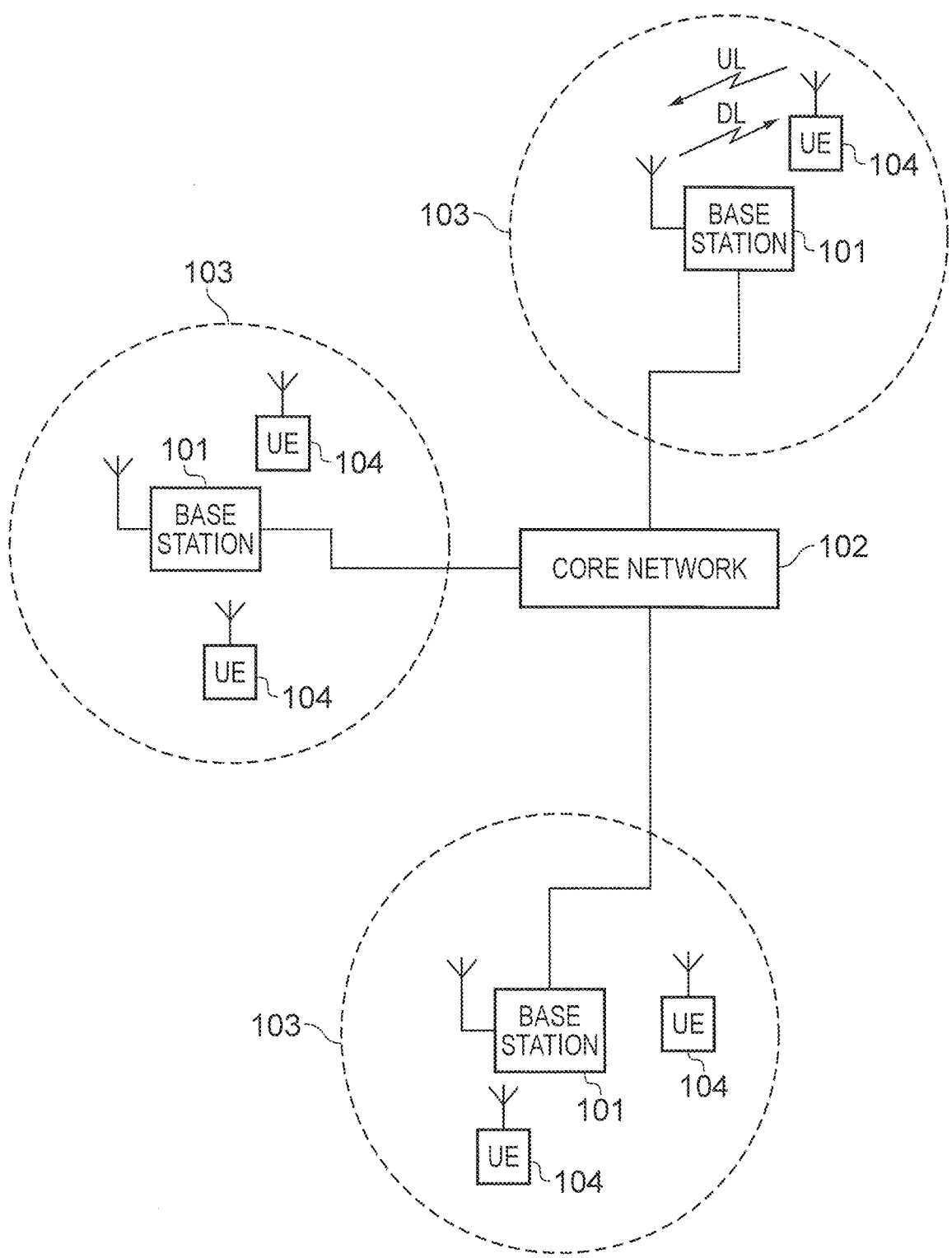
FIG. 1 is a schematic block diagram illustrating an example of a conventional LTE-based mobile telecommunication system.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licenced for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, and so forth. Base stations may also be referred to as transceiver stations/infrastructure equipment/NodeBs/eNodeBs (eNB for short), and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

New Radio Communications System

Figure 2:
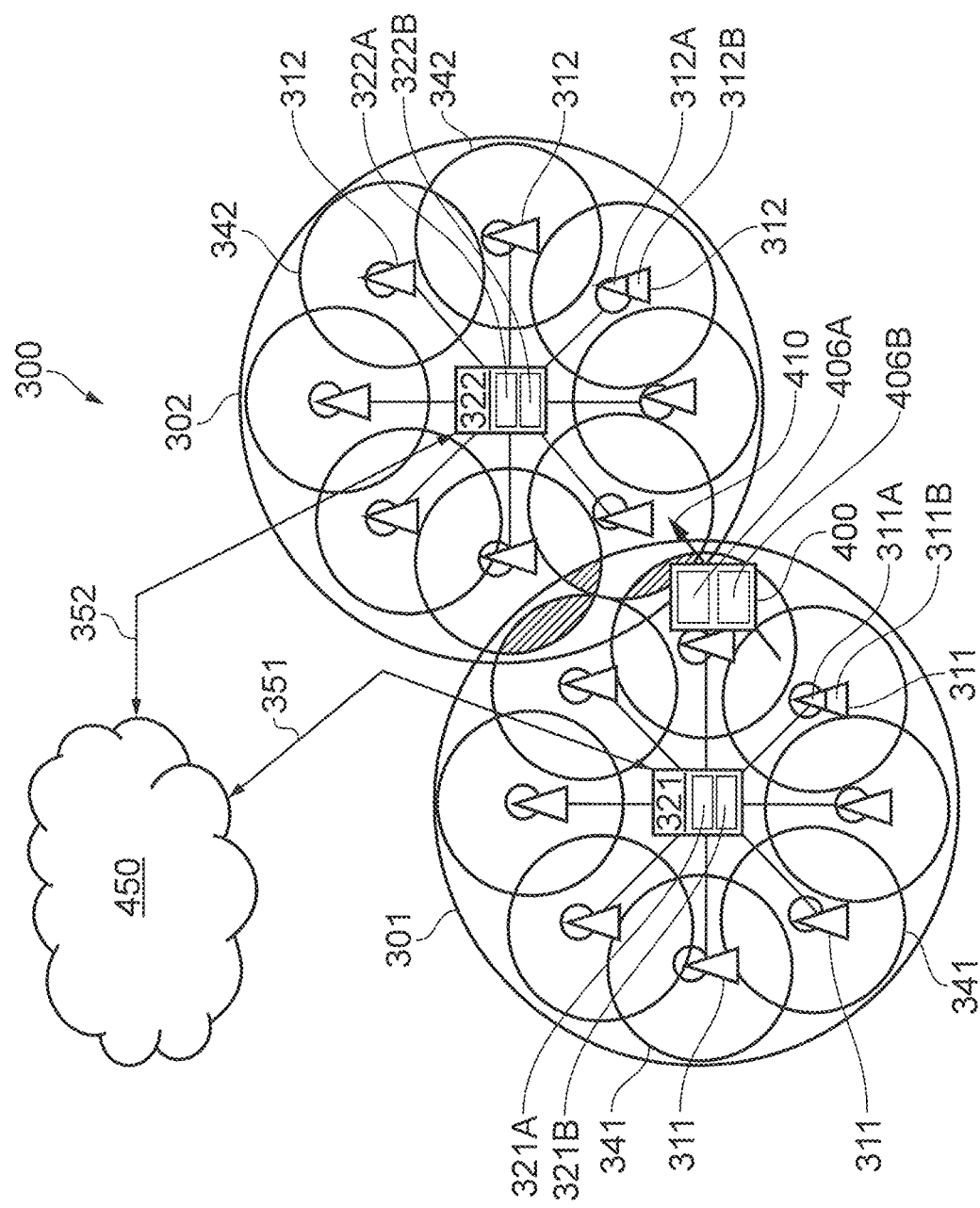
FIG. 2 is a schematic block diagram illustrating an example of a New Radio (NR) based mobile telecommunication system.

FIG. 2 is a schematic diagram illustrating an exemplary network architecture for an NR/new RAT wireless mobile telecommunications network/system 300 based on previously proposed approached and which may be adapted to provide functionality in accordance with embodiments of the disclosure describes herein. The new RAT network 300 of represented in FIG. 2 comprises a first communication cell 301 and a second communication cell 302. Each communication cell 301, 302, comprises a controlling node (centralised unit) 321, 322 in communication with a core network component 450 over a respective wired or wireless link 351, 352. The respective controlling nodes 321, 322 are also each in communication with a plurality of distributed units (radio access nodes/remote transmission and reception points) 311, 312 in their respective cells. Again, these communications may be over respective wired or wireless links. The distributed units 311, 312 are responsible for providing the radio access interface for communications devices connected to the network. Each distributed unit 311, 312 has a coverage area (radio access footprint) 341, 342 which together define the coverage of the respective communication cells 301, 302.

In terms of broad top-level functionality, the core network component 500 of the new RAT telecommunications system represented in FIG. 2 may be broadly considered to correspond with the core network 102 represented in FIG. 1, and the respective control nodes 321, 322 and their associated distributed units 311, 312 may be broadly considered to provide functionality corresponding to base stations of FIG. 1.

A communications device 400 is represented in FIG. 2 within the coverage area of the first communication cell 301. This communications device 400 may thus exchange signalling with the first controlling node 321 in the first communication cell via one of the distributed units 311 associated with the first communication cell 301. For simplicity the present description assumes communications for a given communications device are routed through one of the distributed units, but it will be appreciated in some implementations communications associated with a given communications device may be routed through more than one this to be to units, for example in a soft handover scenario. That is to say, references herein to communications being routed through one of the distributed units should be interpreted references to the occasion being routed through one or more of the distributed units. The controlling node 321 is responsible for determining which of the distributed units 311 spanning the first communication cell 301 is responsible for radio communications with the communications device 400 at any given time. Typically this will be based on measurements of radio channel conditions between the communications device 400 and respective ones of the distributed units 311. In at least some implementations the involvement of the distributed units is transparent to the communications device 400. That is to say, the communications device is not aware of which distributed unit is responsible for routing communications between the communications device 400 and the controlling node 321 of the communication cell 301 in which the communications device is currently operating. That is to say, so far as the communications device is aware, it simply transmits uplink data to the controlling node 321 and receives downlink data from the controlling node 321 and the communications device has no awareness of the involvement of the distributed units 311. In other example network architectures for NR wireless telecommunications systems, a communications device may be configured with one or more of the distributed nodes and be aware of which is distributed unit(s) are involved in its communications. Switching and scheduling of the one or more distributed units is done at the network controlling unit based on measurements by the distributed units of the communications device uplink signal or measurements taken by the communications device and reported to the controlling unit via one or more distributed units.

In the example of FIG. 2, two communication cells 301, 302 and one communications device 400 are shown for simplicity, but it will of course be appreciated that in practice the system may comprise a larger number of communication cells (each supported by a respective controlling node and plurality of distributed units) serving a larger number of communications devices.

It will further be appreciated FIG. 2 represents merely one example of a proposed architecture for a new RAT telecommunications system in which approaches in accordance with the principles described herein may be adopted, and the functionality disclosed herein for handling mobility/handovers in a wireless telecommunications system may also be applied in respect of wireless telecommunications systems having different architectures. That is to say, the specific wireless telecommunications architecture for a wireless telecommunications system adapted to implement functionality in accordance with the principles described herein is not significant to the principles underlying the described approaches.

The communications device 400 comprises a transceiver unit 400A for transmission and reception of wireless signals and a processor unit 400B configured to control the communications device 400. The processor unit 400B may comprise various sub-units for providing functionality in accordance with embodiments of the present disclosure as explained further herein. These sub-units may be implemented as discrete hardware elements or as appropriately configured functions of the processor unit. Thus the processor unit 400B may comprise a processor unit which is suitably configured/programmed to provide the desired functionality described herein using conventional programming/configuration techniques (e.g., NFV (Network Function Virtualization)) for equipment in wireless telecommunications systems. The transceiver unit 400A and the processor unit 400B are schematically shown in FIG. 2 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the communications device 400 will in general comprise various other elements associated with its operating functionality, for example a power source, user interface, and so forth, but these are not shown in FIG. 2 in the interests of simplicity.

The first and second controlling nodes 321, 322 in this example are functionally identical but serve different geographical areas (cells 301, 302). Each controlling node 321, 322 comprises a transceiver unit 321A, 322A for transmission and reception of communications between the respective controlling nodes 321, 322 and distributed units 312, 322 within their respective communication cells 301, 302 (these communications may be wired or wireless). Each controlling nodes 321, 322 further comprises a processor unit 321B, 322B configured to control the controlling node 321, 322 to operate in accordance with embodiments of the present disclosure as described herein. The respective processor units 321B, 322B may again comprise various sub-units for providing functionality in accordance with embodiments of the present disclosure as explained herein. These sub-units may be implemented as discrete hardware elements or as appropriately configured functions of the processor unit. Thus, the respective processor units 321B, 322B may comprise a processor unit which is suitably configured/programmed to provide the desired functionality described herein using conventional programming/configuration techniques for equipment in wireless telecommunications systems. The respective transceiver units 321A, 322A and processor units 321B, 322B for each controlling node 321, 322 are schematically shown in FIG. 2 as separate elements for ease of representation. However, it will be appreciated the functionality of these units can be provided in various different ways, for example using a single suitably programmed general purpose computer, or suitably configured application-specific integrated circuit(s)/circuitry. It will be appreciated the controlling nodes 321, 322 will in general comprise various other elements, for example a power supply, associated with their operating functionality.

The respective distributed units 311, 312 in this example are functionally identical but serve the different parts of the respective communications cells 301, 302 as schematically indicated in FIG. 2. Each distributed unit 311, 312 comprises a transceiver unit 311A, 312A for transmission and reception of communications between the respective distributed units 311, 312 and their associated controlling node 321, 322 and also for transmission and reception of wireless radio communications between the respective distributed units 311, 312 and any communications device they are currently supporting. Each distributed unit 311, 312 further comprises a processor unit 311B, 312B configured to control the operation of the distributed unit 311, 312 in accordance with the principles described herein. The respective processor units 311B, 312B of the distributed units may again comprise various sub-units. These sub-units may be implemented as discrete hardware elements or as appropriately configured functions of the processor unit. Thus, the respective processor units 311B, 312B may comprise a processor unit which is suitably configured/programmed to provide the desired functionality described herein using conventional programming/configuration techniques for equipment in wireless telecommunications systems. The respective transceiver units 311A, 312A and processor units 311B, 312B are schematically shown in FIG. 2 as separate elements for ease of representation. However, it will be appreciated the functionality of these units can be provided in various different ways, for example using a single suitably programmed general purpose computer, or suitably configured application-specific integrated circuit(s)/circuitry. It will be appreciated the distributed units 311, 312 will in general comprise various other elements, for example a power supply, associated with their operating functionality.

Operational Modes for 5G Systems

In 5G, there are in general two operational modes. These are known as tight interworking mode and standalone mode. In tight interworking mode, a 5G NR Node B should work together with an LTE eNodeB. For example, this would be via dual connectivity or carrier aggregation. The LTE eNodeB will work as an anchor eNodeB for the 5G NR Node B. Such scenarios are still under discussion. On the other hand, in standalone mode, the 5G NR Node B could work independently without the assistance of the LTE eNodeB. Both of these operational modes were first discussed in the RAN2 #93bis meeting of 11-15 Apr. 2016.

Figure 3:
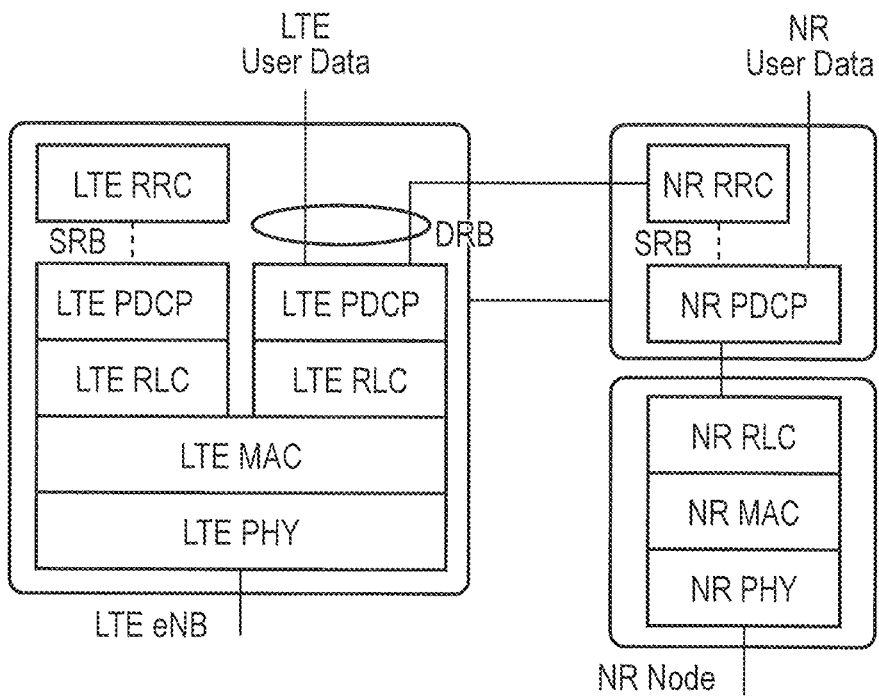
FIG. 3 illustrates an example protocol architecture of 5G user and control planes.

In RAN2 #93bis meeting document "RAN interworking between NR and LTE" [2], a protocol architecture of 5G user and control planes is presented. In this architecture, which is shown in FIG. 3, control signalling of NR RAN is transferred via an LTE data bearer, which could re-use existing LTE procedures with minimised modifications.

Figure 4:
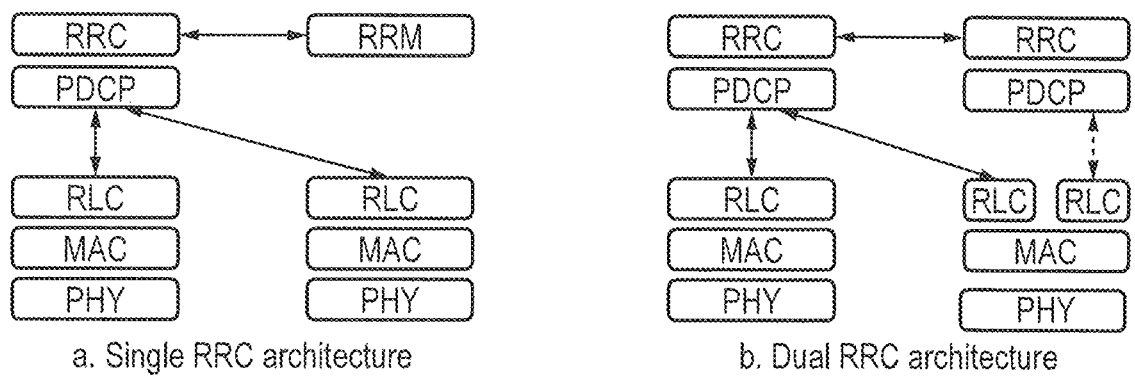
FIG. 4 illustrates the difference between an exemplary single RRC architecture and an exemplary dual RRC architecture.

In a second RAN2 #93bis meeting document, "Tight integration of the New Radio interface (NR) and LTE: Control Plane design" [3], dual RRC is proposed in which two separate RRC entities, for example an LTE eNodeB and an NR Node B as shown in FIG. 4b, can generate RRC messages to the UE. Control plane diversity can be provided by means of Packet Data Convergence Protocol (PDCP) level split and combining. Local configuration of lower layers is possible. The coordination of radio resource management functions between NR and LTE RATs is required.

Figure 5:
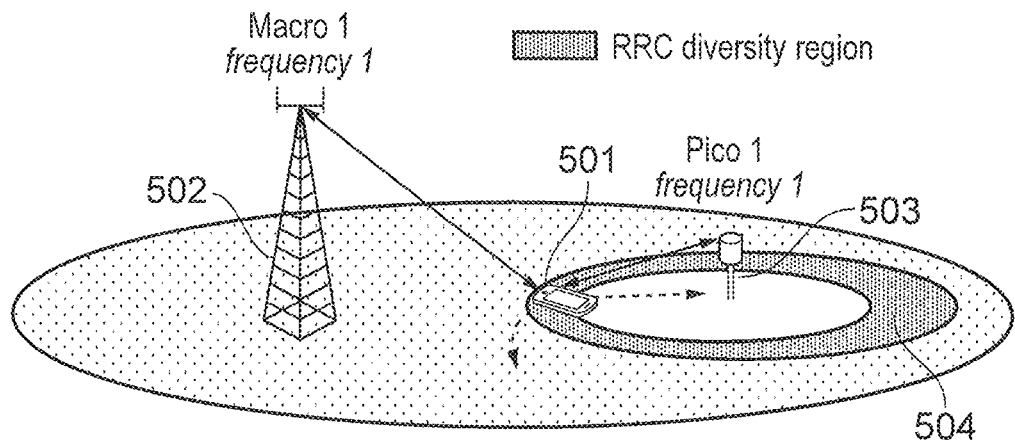
FIG. 5 provides an example of RRC diversity.

RRC diversity was proposed in Rel-12 dual connectivity. It was proposed as a potential solution for improving mobility robustness, and therefore to enhance the handover performance. In 3GPP document TR 36.842 [4], with RRC diversity, the handover related RRC signalling could additionally be transmitted from or to a potential target cell, as shown in FIG. 5. Radio link failure (RLF) could in this case be prevented as long as the UE 501 is able to maintain a connection to at least one of the macro 502 or pico cells 503. A shaded RRC diversity region 504 is a region in which, should the UE 501 be located, RRC diversity can be applied. The RRC diversity has advantages such as robustness, flexibility as well as scalability, and can be used to avoid the UE RRC re-establishment procedure.

Figure 6:
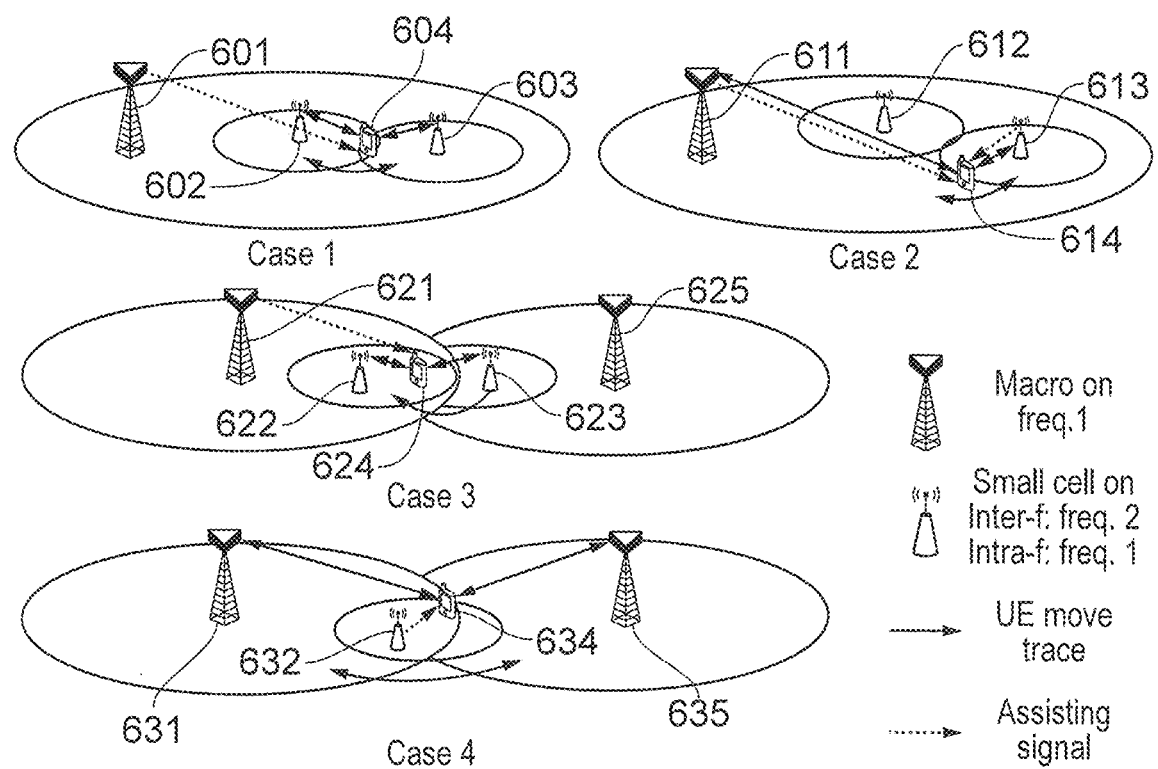
FIG. 6 displays four example handover cases in which RRC diversity can be used for control plane assistance.

FIG. 6 displays four example handover cases in which RRC diversity can be used for control plane assistance, as described in RAN2 #83 meeting document "Performance of Control Plane Diversity" [5].

In Case 1, during mobility of a UE 604 between two small cells 602 and 603, the macro cell 601, in which both small cells 602 and 603 are located, provides additional assistance.

In Case 2, during mobility of a UE 614 between a macro cell 611 and a small cell 612 (in either direction), where the small cell 612 and a second small cell 613 are located within the coverage area of the macro cell 601, the target cell can provide signalling assistance while the UE 614 is still connected to the source cell, and vice versa.

Case 3 is similar to Case 1, in that during mobility of a UE 624 between two small cells 622 and 623, additional assistance is provided by a macro cell. In this case, there are two macro cells 621 and 625, and it is only the best macro cell (in this instance, macro cell 621) which provides the additional assistance.

The final case, Case 4, shows an example of mobility of a UE 634 between two macro cells 631 and 635. At the intersection between the two macro cells 631 and 635 sits a small cell 632, which in some scenarios (such as the one displayed by Case 4) can provide signalling assistance during the mobility of the UE 634 between the two macro cells 631 and 635.

NR Deployment Scenarios

Standalone NR

In terms of cell layout, the following scenarios are assumed for the study of NR communications systems operating in standalone mode. These are:

Homogeneous deployment, where all of the cells within the communications system provide similar coverage. For example, these cells might be macro cells only or small cells only;

Heterogeneous deployment, where cells of different sizes are overlapped within the communications system, which may include, for example, both macro and small cells.

Figure 7:
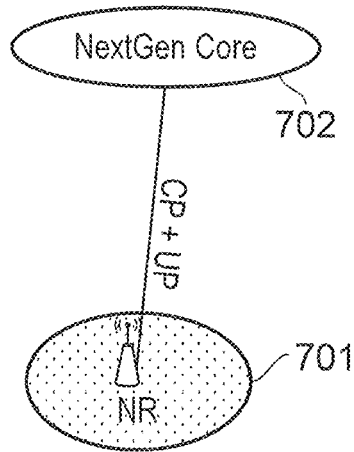
FIG. 7 provides an example of a core network to RAN connection for standalone NR operation.

In terms of core network to RAN connection, a scenario as illustrated in FIG. 7 is assumed for the study of standalone NR operation. In FIG. 7, as can be seen, an NR Node B 701 is connected to the NextGen (5G) core network 702 for both the communication of both user plane (UP) and control plane (CP) signals.

Figure 8:
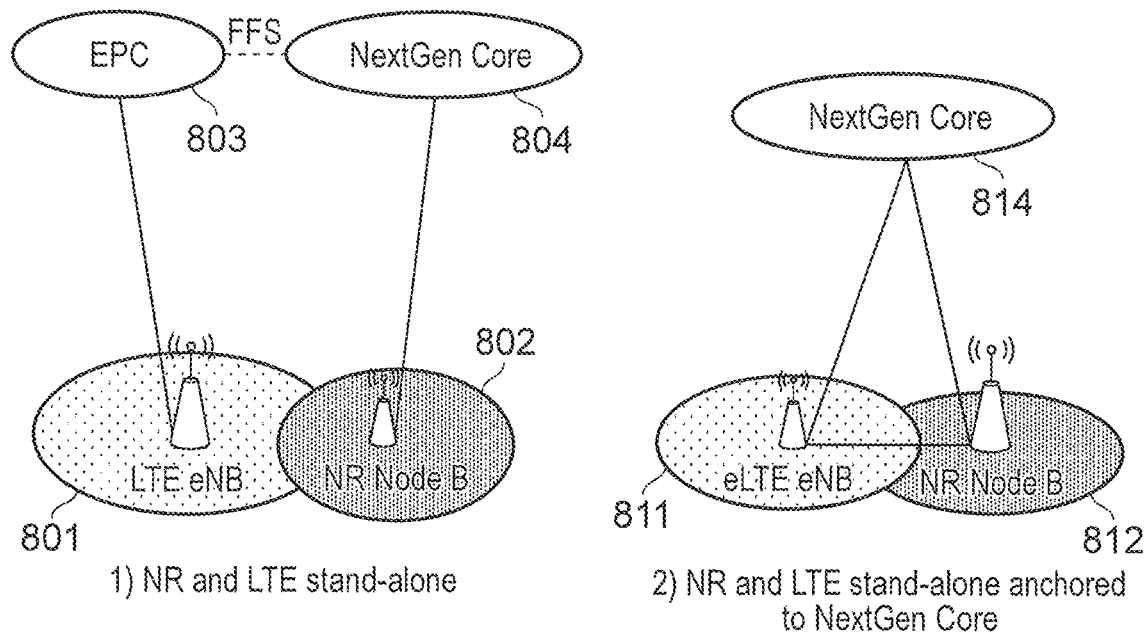
FIG. 8 provides two examples of core network to RAN connections for inter-RAT mobility between NR and LTE.

FIG. 8 shows the two deployment scenarios which are assumed for inter-RAT mobility between NR and LTE. In the first of these deployment scenarios for inter-RAT mobility between NR and LTE, an LTE eNodeB 801 is connected to the Evolved Packet Core (EPC) 803—the core network of the LTE system, and a NR Node B 802 is connected to the NextGen core network 804. In such a deployment scenario, any connection or exchange of signals between the two core networks (EPC and NextGen) is for further study.

In the second of these deployment scenarios for inter-RAT mobility between NR and LTE, both an enhanced LTE (eLTE) eNodeB 811 and an NR Node B 812 are connected to the NextGen core network 814.

LTE-NR Aggregation for Tight Interworking

Figure 9:
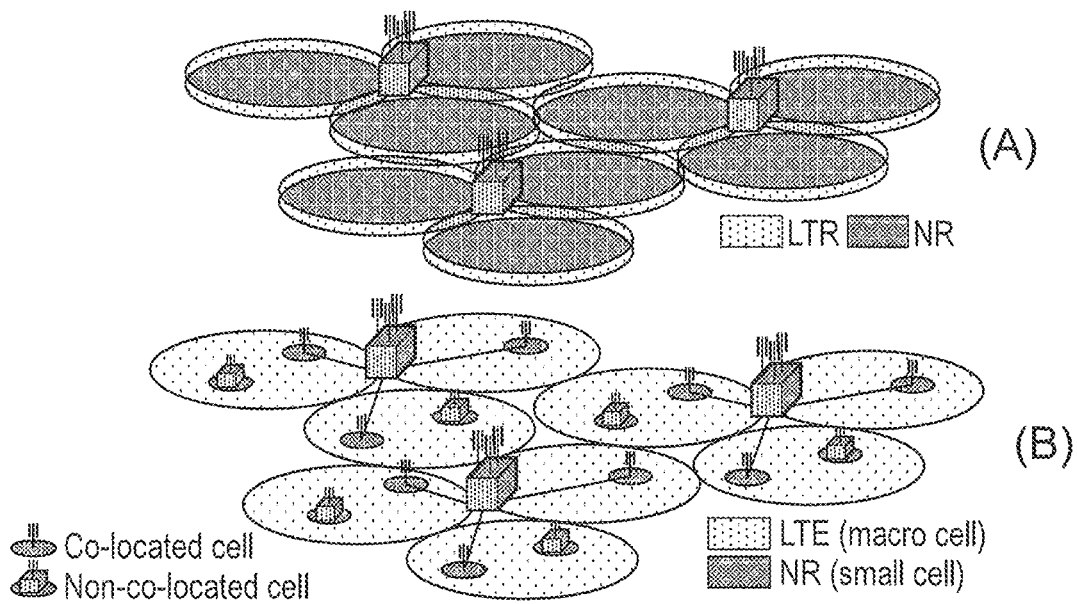
FIG. 9 shows an example cell layout for LTE-NR aggregation scenarios.

FIG. 9 shows deployment scenarios in terms of cell layout and eNodeB location assumed for the study of LTE-NR aggregation. The top half of FIG. 9 (A) shows a scenario where both LTE and NR cells are overlaid and co-located, and are providing similar or the same coverage. The LTE and NR cells are either both macro cells or both small cells. The bottom half of FIG. 9(B) shows another scenario where LTE and NR cells are overlaid, and either co-located or not co-located, and providing different coverage. In FIG. 9(B), LTE serves macro cells and NR serves small cells. The opposite scenario is also considered. A co-located cell refers to a small cell together with a macro cell for which the eNodeB of each cell is installed at the same location. A non-co-located cell refers to a small cell together with a macro cell for which the eNodeB of each cells is installed at a different location.

Figure 10:
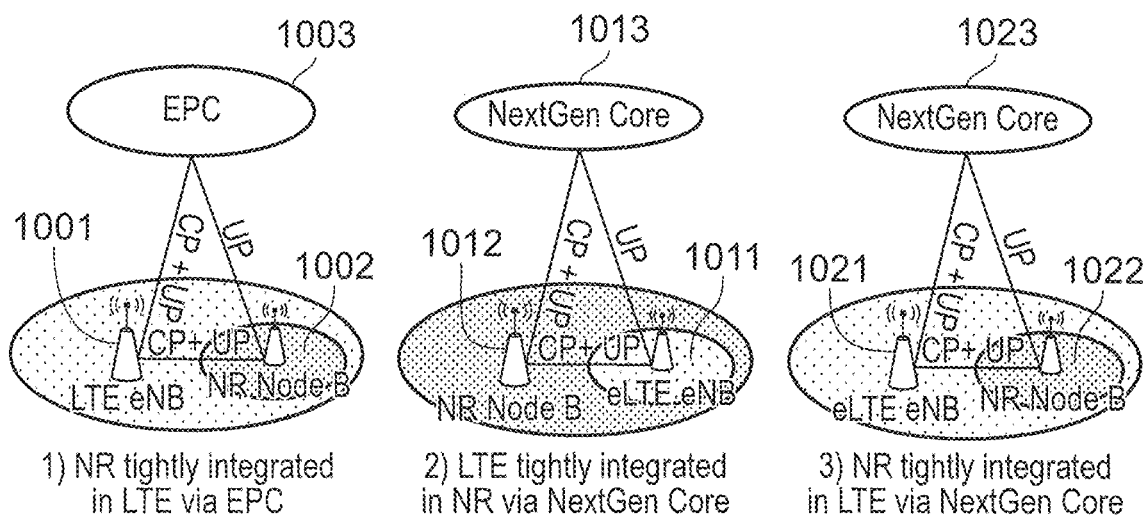
FIG. 10 provides three examples of core network to RAN connections for LTE-NR aggregation scenarios.

FIG. 10 shows three deployment scenarios of core network to RAN connections assumed for the study of LTE-NR aggregation. These are:

1) NR tightly integrated in LTE via EPC;
2) LTE tightly integrated in NR via NextGen core;
3) NR tightly integrated in LTE via NextGen core.

In scenario 1), there is only one control plane connection to the EPC 1003, and this is to the LTE eNodeB 1001. User plane data is routed to the RAN (LTE eNodeB 1001 and NR Node B 1002) directly through the core network on a bearer basis. Alternatively, user plane data flow in the same bearer is split at the RAN.

In scenario 2), there is only one control plane connection to the NextGen core network 1013, and this is to the NR Node B 1012. User plane data is routed to the RAN (LTE eNodeB 1011 and NR Node B 1012) directly through the core network on a bearer basis. Alternatively, user plane data flow in the same bearer is split at the RAN.

In scenario 3), there is only one control plane connection to the NextGen core network 1023, and this is to the LTE eNodeB 1021. User plane data is routed to the RAN (LTE eNodeB 1021 and NR Node B 1022) directly through the core network on a bearer basis. Alternatively, user plane data flow in the same bearer is split at the RAN.

Interworking with WLAN

Figure 11:
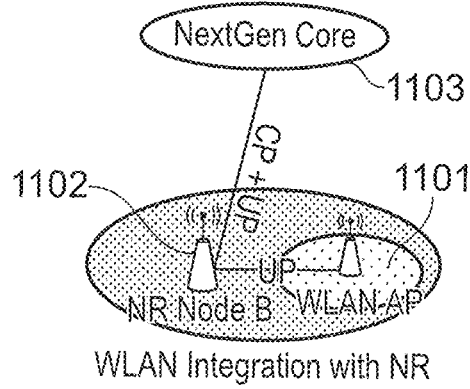
FIG. 11 provides an example of a core network to RAN connection for WLAN integration with NR.

FIG. 11 shows a deployment scenario in terms of a core network to RAN connection assumed for wireless local area network (WLAN) integration with NR. In this scenario, WLAN (supported by access point 1101) is integrated in NR (supported by NR Node B 1102) via the NextGen core network 1103.

Dual RRC-RLF Recovery

Figure 12:
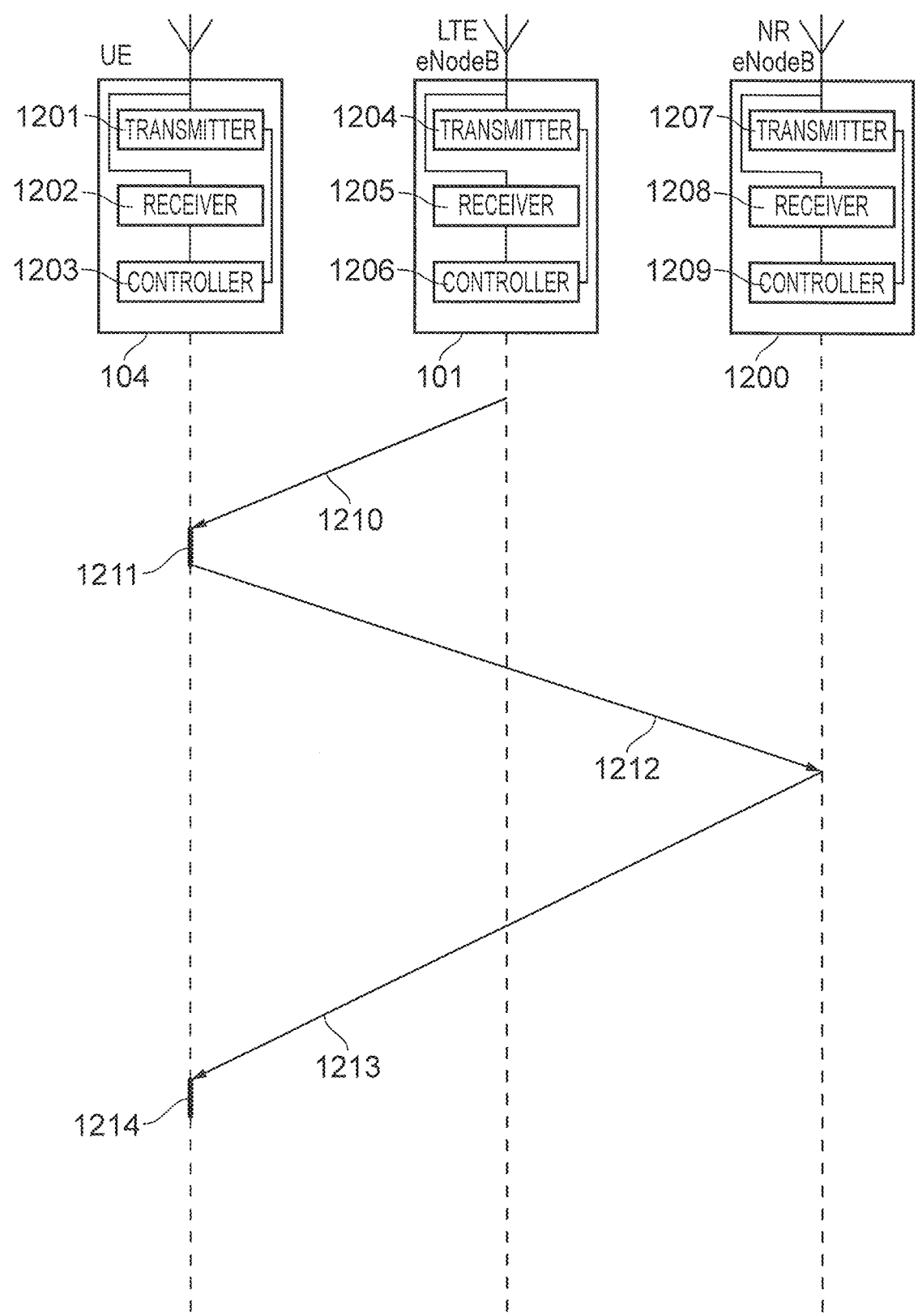
FIG. 12 is a first example of a part schematic representation, part message flow diagram of communications between a UE, an LTE eNodeB and an NR Node B in accordance with embodiments of the present disclosure.

FIG. 12 provides a message exchange diagram according to an example embodiment of the present technique. The message exchange diagram of FIG. 12 describes a method of communicating in a wireless telecommunications system comprising a communications device 104, a master cell group comprising a plurality of infrastructure equipment of a first type 101 and a secondary cell group comprising one or more infrastructure equipment of a second type 1200, the communications device 104 being in a coverage area of one of the infrastructure equipment of the first type 101 and a coverage area of at least one of the infrastructure equipment of the second type 1200, wherein the communications device 104 is configured to transmit signals to and receive signals from the infrastructure equipment of the first type 101 in accordance with a first communications protocol and to transmit signals to and receive signals from the at least one infrastructure equipment of the second type 1200 in accordance with a second communications protocol, the second communications protocol being different to the first communications protocol. Each of the communications device 104, the infrastructure equipment of the first type 101 and the infrastructure equipment of the second type 1200 comprise a transmitter 1201, 1204, 1207 configure to transmit signals, a receiver 1202, 1205, 1208 configured to receive signals and a controller 1203, 1206, 1209 configured to control the transmitter 1201, 1204, 1207 and receiver 1202, 1205, 1208 to transmit and receive the signals.

The method comprises establishing 1210 a measurement of radio conditions associated with a first communications path between the communications device and the infrastructure equipment of the first type, determining 1211 that the first communications path is not appropriate for use by the communications device, transmitting 1212 a failure message from the communications device to one of the infrastructure equipment of the second type via a second communications path, the failure message providing information regarding the determination that the first communications path is not appropriate for use by the communications device, receiving 1213 at the communications device a signal comprising a reconfiguration message from the one of the infrastructure equipment of the second type via the second communications path, and establishing 1214, using the reconfiguration message, signals to be transmitted by the communications device and signals to be received by the communications device.

Although in FIG. 12 the infrastructure equipment of the first type (forming part of the MCG) is depicted as an LTE eNodeB, and the infrastructure equipment of the second type (forming part of the SCG) is depicted as an NR eNodeB, those skilled in the art would appreciate that embodiments of the present disclosure could be equally applied if this were the other way around.

Figure 13:
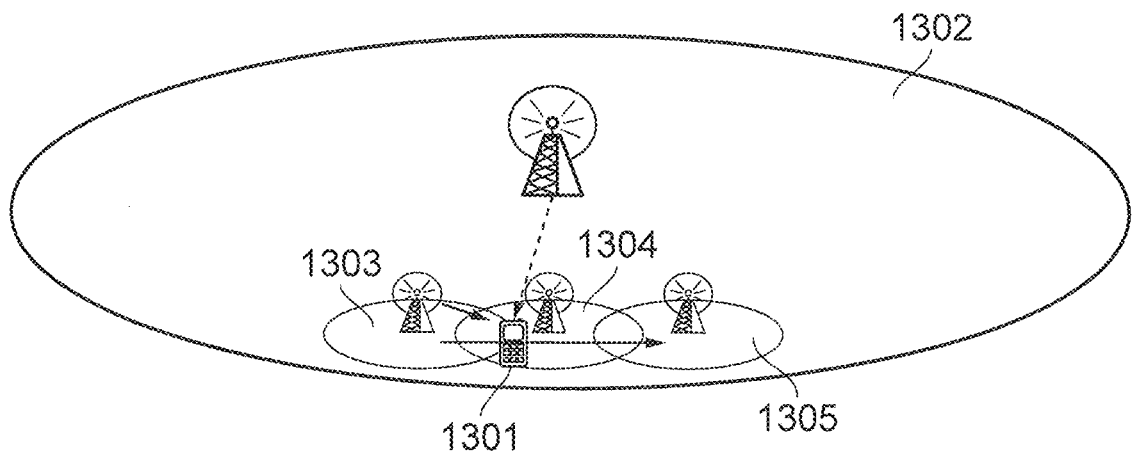
FIG. 13 illustrates an example scenario for dual RRC basic mobility in accordance with embodiments of the present disclosure.

Of the various deployment scenarios that will require a dual connection to both LTE and NR, the scenario illustrated by FIG. 13 is one of the most likely.

In this scenario, a UE 1301 is connected to an LTE macro cell 1302, which may be providing the primary control plane functionality (e.g. similar to a primary cell (PCell)). The UE 1301 is also connected to one or more NR cells 1303, 1304, 1305, which provide the necessary bandwidth for high user plane throughput (e.g. similar to secondary cells (SCells)). It will be appreciated that the NR cells 1303 to 1305 might consist of more than one transmission reception point/distributed unit (TRP/DU) connected to a single control unit (CU). In this simple mobility scenario, the UE 1301 remains under the coverage of the same LTE cell 1302, while passing through the coverage of multiple NR small cells 1303 to 1305.

According to the current LTE radio link failure (RLF) procedure, a UE using dual connectivity monitors for RLF on the PCell of the master cell group (MCG) and the primary secondary cell (PSCell) of the secondary cell group (SCG). The MCG consists of the PCell and one or more SCells. The SCG consists of the PSCell and one or more SCells. If RLF is detected on the MCG then the UE needs to perform RRC re-establishment procedure (signalling radio bearers (SRBs)—i.e. control plane is always on MCG). If RLF is detected on the SCG then SCG failure information is transmitted to the MCG.

With dual RRC, there is an opportunity to optimise the procedure, in particular when RLF is detected on the MCG. In order to avoid performing the RRC re-establishment procedure (which is costly in terms of service interruption) the UE can switch to signalling over SCG and transmit failure information to the SCG (which potentially automatically switches the SCG to be the MCG and vice versa). This then allows recovery assistance information (or Radio Bearer Reconfiguration) to be received from the SCG in order to maintain the connection without any service interruption.

Once the network receives the failure indication on the SCG, then a reconfiguration is transmitted to the UE which would either re-configure MCG with new radio links, e.g. if NR link quality is lower than criteria, or complete a reconfiguration of SCG to be the MCG (inter-RAT reconfiguration/recovery via target RAT), e.g. if NR link quality is higher than criteria.

Figure 14:
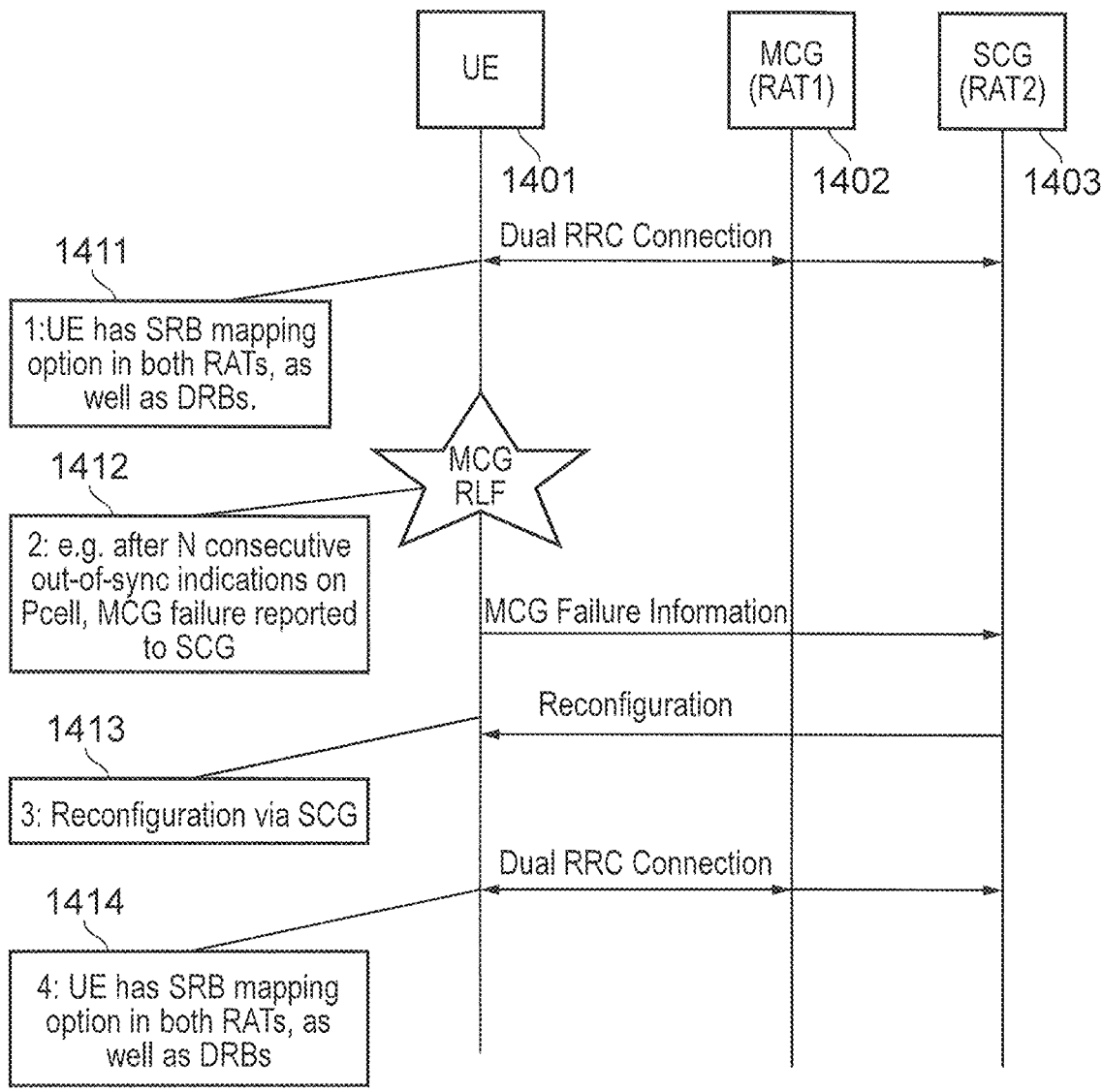
FIG. 14 shows an example signalling procedure for a master cell group recovery via failure reporting to a secondary cell group in accordance with embodiments of the present disclosure.

FIG. 14 shows an example signalling procedure for MCG recovery via failure reporting to SCG, in a communications system comprising a communications device (UE 1401), one or more infrastructure equipment of a first type (MCG/RAT1 1402) and one or more infrastructure equipment of a second type (SCG/RAT2 1403).

In the first step 1411, the UE 1401 has a dual connection to LTE and NR. The SCG 1403 could either be LTE or NR, but in this example it is assumed that the MCG 1402 consists of an LTE PCell and one or more LTE SCells, while the SCG 1403 consists of an NR PSCell and one or more NR SCells. The UE 1401 has a SRB (signalling radio bearer) mapping option for both RATs—in some examples the RRC signalling at this stage is performed exclusively via MCG 1402 (RRC messages generated in NR are transmitted via the SRBs in LTE MCG) and the mapping option for NR is for fallback only, and in other examples each RAT can sent RRC messages independently.

In the second step 1412, the UE 1401 detects radio link failure on LTE (for example by detecting n consecutive out-of-sync indications on the PCell). Rather than initiating RRC re-establishment on LTE, the UE 1401 switches to signalling via NR and transmits failure information to NR, which may include measurements, failure reason and so on. As part of this, the UE 1401 may automatically switch its MCG 1402 to NR. Alternatively the UE 1402 may wait for the response. Embodiments of the present disclosure comprise the triggering of a "failure condition" other than radio link failure. Other failure conditions may include an RLC unrecoverable error (a predefined number of RLC retransmissions without an ACK), handover failure (e.g. handover command not acknowledged, timer expiry after transmitting handover or reconfiguration message), or the failure may be pre-empted—for example if the UE 1401 is at the edge of coverage, then rather than attempting handover from the source, the "error" may be reported to secondary RAT 1403—this may still be considered an error condition, the error condition being poor link quality detected at the source RAT 1402.

In the third step 1413, a reconfiguration messages is sent via NR. This may include new configuration for LTE, it may include MCG switch from LTE to NR (could also be considered as inter-RAT/intra-RAT handover sent via the new RAT after failure of original RAT, as the original MCG may become the target SCG, and the original SCG may become the target MCG. As another example, the new configuration may include the information of the SCell in the original MCG which will become the PCell. As another example, the new configuration may include the information of the PSCell or the SCell in the original SCG which will become the PCell and the information of the PCell or the SCell in the original MCG which may become cells in the SCG). This may alternatively indicate a release of LTE radio links altogether. In an embodiment of the present disclosure, and as mentioned above, this reconfiguration may be triggered as a handover command issued by the target RAT 1403, if radio conditions in the source RAT 1402 are poor (so instead of triggering handover from the source, the target triggers a handover). In this case, the error condition may be detected by the network rather than the UE 1401.

In the fourth step 1414, it is assumed that LTE has a new configuration and the UE 1401 continues with a dual RRC connection to both RATs, but this is dependent on the new configuration from the network. The network may alternatively release the source RAT 1402, and switch (handover) the MCG from initial RAT 1402 to second RAT 1403.

Radio Link Failure (RLF) Detection

Figure 15:
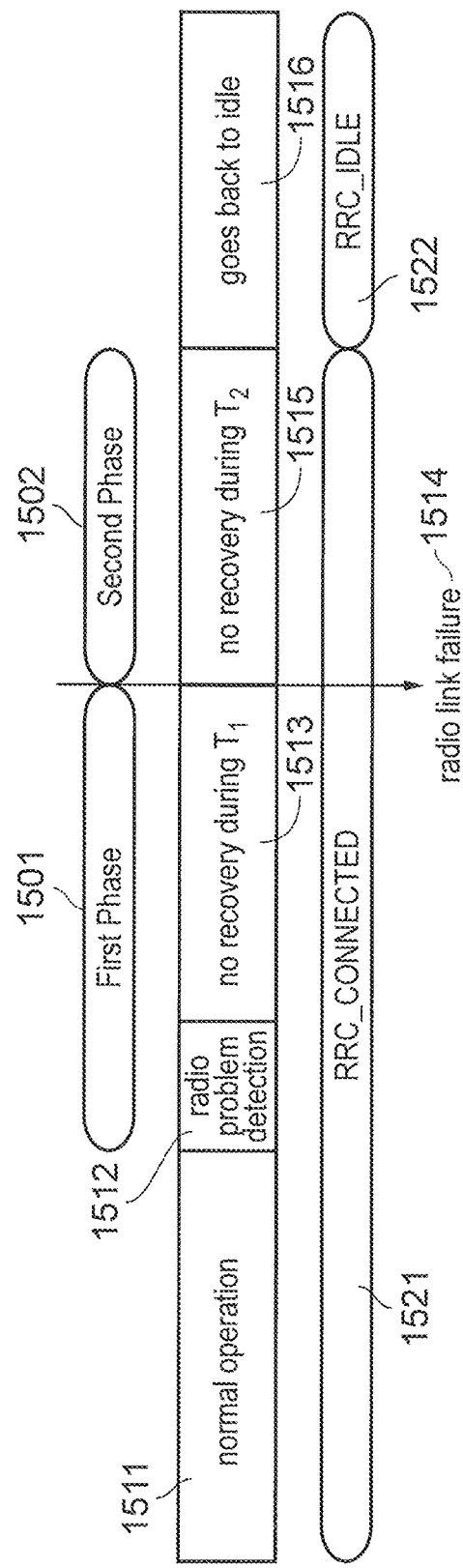
FIG. 15 illustrates the phases of radio link failure.

In 3GPP document TS 36.300 [6], it is taught that two phases govern the behaviour associated with RLF. This is shown in FIG. 15, which is taken from this document.

The first phase 1501 is started upon radio problem detection 1512 during normal operation 1511 of a UE in the RRC_CONNECTED state 1521, which leads to RLF detection. There is no UE-based mobility in this phase 1501. The radio problem detection 1512 is based on the expiry of a timer of time T₁ (T310), or some other criteria (for example counting), and occurs after N consecutive out-of-sync indications (N310) 1513.

The second phase 1502 is started upon RLF detection or handover failure 1514. This leads to the UE entering 1516 the RRC_IDLE state 1522, where mobility is UE-based. Again the entering of this state is based on the expiry of a timer, of time T₂ (T311, which is started after T310 expiry). During T₂ 1515, the UE attempts to select a new suitable cell. If a suitable cell is found, the UE sends an RRC re-establishment request and tries to recover the connection on a new cell.

Methods and systems according to embodiments of the present technique allow the recovery from RLF more efficiently, before these timers expire.

The radio problem detection phase 1512 is conventionally triggered after the detection of N consecutive out-of sync indications (N310), and the timer T310 is started 1513. In one embodiment, a failure information report is transmitted to the second RAT at this point. If no successful reconfiguration is received (the third step 1413 of FIG. 14) before expiry of T310, then RLF procedure continues as legacy. In one embodiment a new timer is introduced, during which the UE waits for the response from the second RAT. Upon expiry, T310 is started.

In another embodiment, the failure is reported to the second RAT after T310 expiry (T310 allows time for the UE to attempt to re-gain synchronisation and the timer is stopped after N consecutive in-sync indications from layer 1). Again, the UE waits for a reconfiguration from the second RAT, before continuing to enter idle mode. Again, a new timer may be used for waiting for the response from the first RAT.

In summary, in order to reduce the time spent performing radio link failure recovery, the failure information is sent to the second RAT before the first or the second phase of the radio link failure recovery in order to speed up radio link failure recovery and provide a more robust method of recovering radio link problems.

Advantages of embodiments of the present technique described with regard to dual RRC RLF recovery include the provision of a fallback mechanism to reduce service interruption due to radio link failure on a primary/master cell group in the primary RAT by transmitting failure information and receiving reconfiguration via a secondary RAT. Embodiments of the present disclosure allow a handover command to be sent via the secondary (target) RAT in case of poor radio link quality in the primary (source) RAT, thus reducing handover failure probability.

Early Termination of RLF Timer

The optimisation of the RLF timer was considered in RAN2 #82 meeting document "RLF recovery enhancements" [7]. In heterogeneous scenarios (where small cells and macro cells are mixed), waiting for the recovery of link quality for a long time may result in the connection being lost. Better results appear to be achieved from switching to another cell and performing RRC re-establishment rather than waiting for the recovery of the current cell. Thus, a potential solution to this problem is the early termination of the RLF timer (T310).

As described in [7], it is considered that the large RLF interruption time is mainly caused by the UE having to stick to the current serving cell until T310 expiry (1 second). In the current specification, the UE is required to wait for T310 expiry before initiating the RRC connection re-establishment procedure. Instead, the UE could initiate RRC connection re-establishment procedure before T310 expiry if the following conditions are met: T310 is running, and event A3 (which triggers a handover) is triggered for a neighbour cell.

Figure 16:
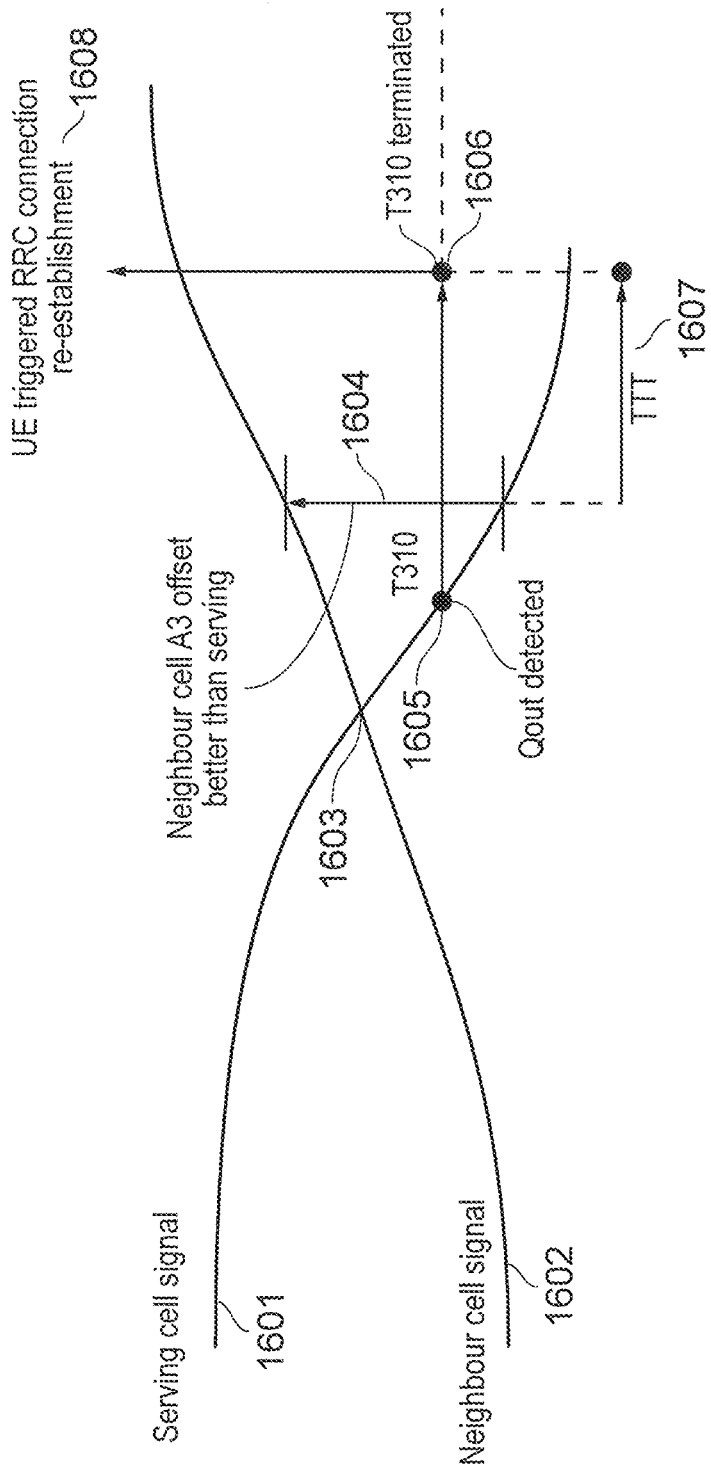
FIG. 16 demonstrates an exemplary scenario which results in the early termination of the radio link failure (RLF) timer T310.

This is also illustrated in FIG. 16, which is taken from [7]. At a point 1603, a quality of received signals by a UE from a neighbouring cell 1602 becomes higher than a quality of received signals from a serving cell 1601. At a point 1605, when the quality of received signals from the serving cell 1601 reaches a level Qout, timer T310 is initiated. At a point later in time, the neighboring cell's signals 1602 are determined to be a predetermined amount greater (thus triggering A3) 1604 than the serving cell's signals 1601. After time TTT 1607, the T310 timer is terminated 1606, and the UE initiates RRC connection re-establishment 1608.

In embodiments of the present disclosure which relate to the early termination of the RLF timer, there are differences from the techniques of RLF recovery in dual RRC connections described with regard to FIGS. 12 to 15 above. These include:

In addition to the LTE cell, the NR cell is connected in dual RRC operation;

If the LTE neighbour cell link is not better than the serving cell, the RRC connection (MCG) is either switched from the LTE cell to the NR cell, or dual RRC is triggered; and The link quality of the NR cell may be monitored at the eNodeB rather than at the UE, so as to use uplink based measurements.

In short, it appears preferable to wait for the recovery of the current LTE link quality rather than initiate RRC re-establishment to another cell, because the NR cell keep the connection in terms of link quality even if it is not possible to ultimately recover the LTE link. In embodiments of the present technique, it is envisioned that the LTE RLF operation is changed depending on the link quality of the NR connection.

Figure 17:
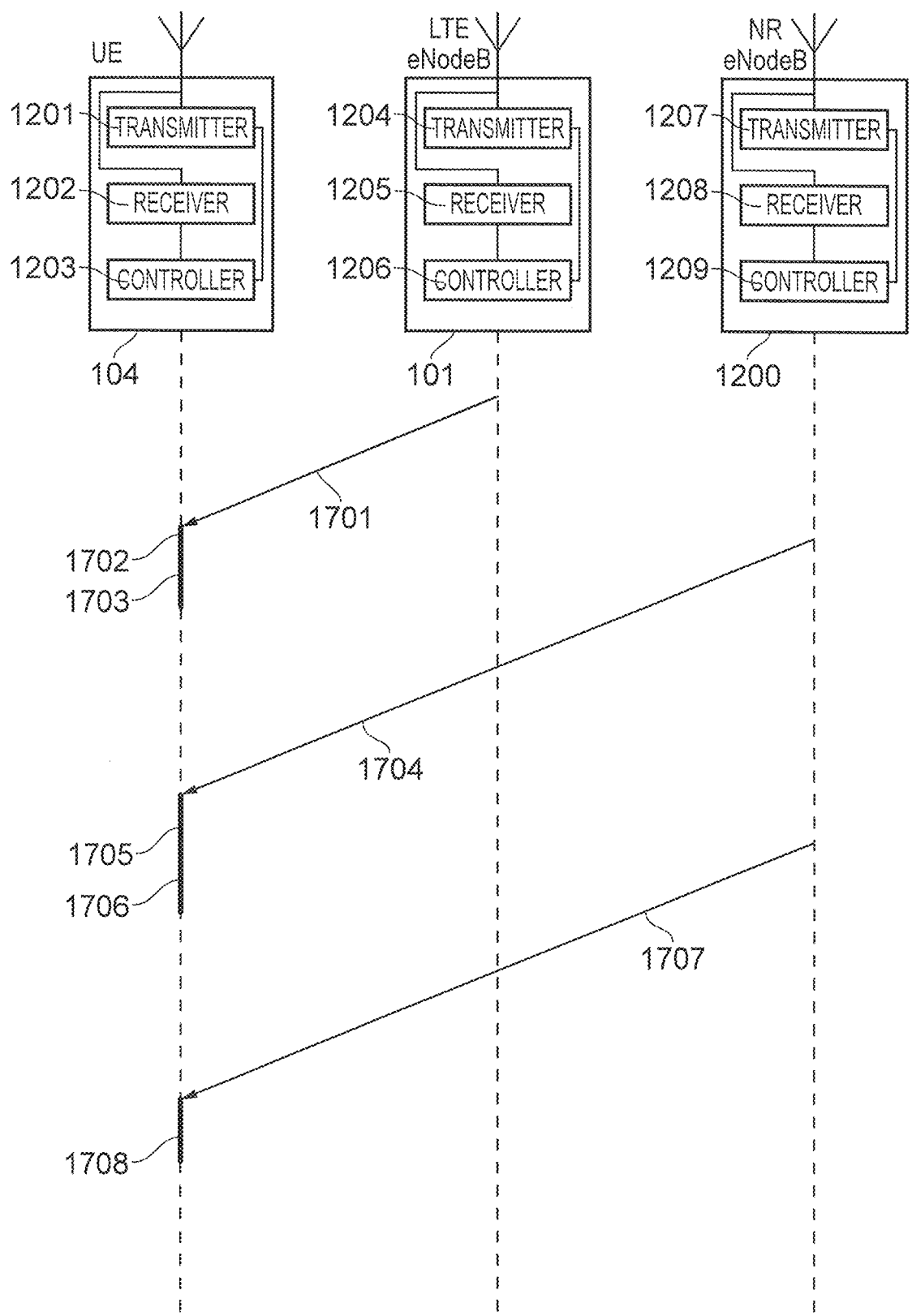
FIG. 17 is a second example of a part schematic representation, part message flow diagram of communications between a UE, an LTE eNodeB and an NR Node B in accordance with embodiments of the present disclosure.

FIG. 17 provides a message exchange diagram according to an example embodiment of the present technique. The message exchange diagram of FIG. 17 describes a method of communicating in a wireless telecommunications system comprising a communications device 104, a master cell group comprising a plurality of infrastructure equipment of a first type 101 and a secondary cell group comprising one or more infrastructure equipment of a second type 1200, the communications device 104 being in a coverage area of one of the infrastructure equipment of the first type 101 and a coverage area of at least one of the infrastructure equipment of the second type 1200, wherein the communications device 104 is configured to transmit signals to and receive signals from the infrastructure equipment of the first type 101 in accordance with a first communications protocol and to transmit signals to and receive signals from the at least one infrastructure equipment of the second type 1200 in accordance with a second communications protocol, the second communications protocol being different to the first communications protocol. Each of the communications device 104, the infrastructure equipment of the first type 101 and the infrastructure equipment of the second type 1200 comprise a transmitter 1201, 1204, 1207 configure to transmit signals, a receiver 1202, 1205, 1208 configured to receive signals and a controller 1203, 1206, 1209 configured to control the transmitter 1201, 1204, 1207 and receiver 1202, 1205, 1208 to transmit and receive the signals.

The method comprises establishing 1701 a first measurement of radio conditions associated with a first communications path between the communications device and the infrastructure equipment of the first type, the first measurement of radio conditions comprising a quality of the first communications path, determining 1702 that the quality of the first communications path is below a first predetermined threshold, initiating 1703 a timer, the timer being configured to expire after a predetermined amount of time, establishing 1704 a second measurement of radio conditions associated with a second communications path between the communications device and one of the infrastructure equipment of the second type, the second measurement of radio conditions comprising a quality of the second communications path, determining 1705 that the quality of the second communications path is below a second predetermined threshold, terminating 1706 the timer before the predetermined amount of time has elapsed, receiving 1707 at the communications device a signal comprising a re-establishment command, and establishing 1708 that, using the re-establishment command, the communications device should transmit signals to and receive signals from a second infrastructure equipment of the first type via a third communications path.

Although in FIG. 17 the infrastructure equipment of the first type (forming part of the MCG) is depicted as an LTE eNodeB, and the infrastructure equipment of the second type (forming part of the SCG) is depicted as an NR eNodeB, those skilled in the art would appreciate that embodiments of the present disclosure could be equally applied if this were the other way around.

The handover (MCG change) trigger optimisation may be that, when the link quality of NR is good and/or stable, the UE waits for the recovery of the existing LTE link quality longer (for example, early timer termination is not applied or the UE stops T310). When the link quality of the NR link is poor and/or unstable, the UE induces early RRC re-establishment to another cell (for example, early timer termination is applied; it is assumed that UE context information is already shared between the old cell and the new cell). Alternatively, the network may initiate RRC re-configuration to instruct the UE to hand over to another cell based on, for example, uplink reference signalling in order to stop T310 (early timer termination)

When the NR cell detects the consecutive out-of-sync indications (N310) in the network, LTE RRC re-establishment should be encouraged, because there is an imminent risk of losing the NR connection.

The indication of early termination being activated/deactivated may be done by:

Indication via NR air interface;
- NR eNodeB sends the event (e.g. for improved quality of NR) to UE via NR;
- UE deactivates the early termination of LTE T310 timer
Alternatively,
- UE detects the deterioration of the NR link if the downlink reference signal of NR is available.
- UE voluntarily activates the early termination of the LTE T310 timer.

Indication via the X2 interface (between the NR eNodeB and the LTE eNodeB interface);
- NR eNodeB indicates the NR link quality deterioration to the LTE eNodeB via the X2 interface;
- LTE eNodeB indicates the activation of early termination of the LTE T310 timer to the UE (or modifies the timer value) if the LTE link quality is still good enough; or Early termination may always be activated (or deactivated) according to the RRC configuration Advantages of embodiments of the present technique described with regard to early termination of the RLF timer include minimising the risk of both LTE and NR link being lost, avoiding a change in frequency of the cell/the requirement of RRC re-establishment in the LTE cell, and that there is little impact on the existing LTE procedures.

Figure 18:
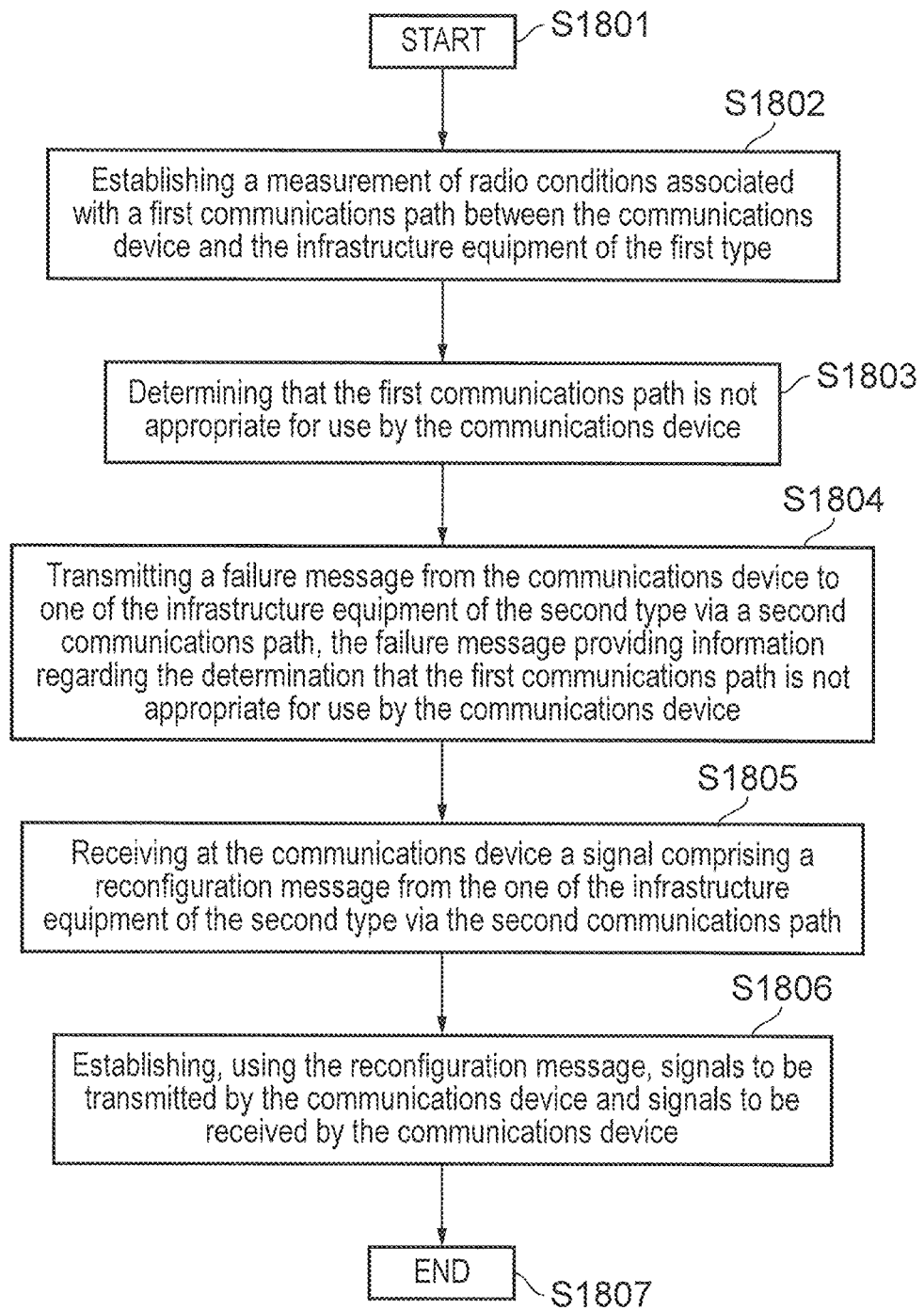
FIG. 18 shows a flow diagram illustrating a first process of communications between a UE, an LTE eNodeB and an NR Node B in accordance with embodiments of the present disclosure.
Figure 19:
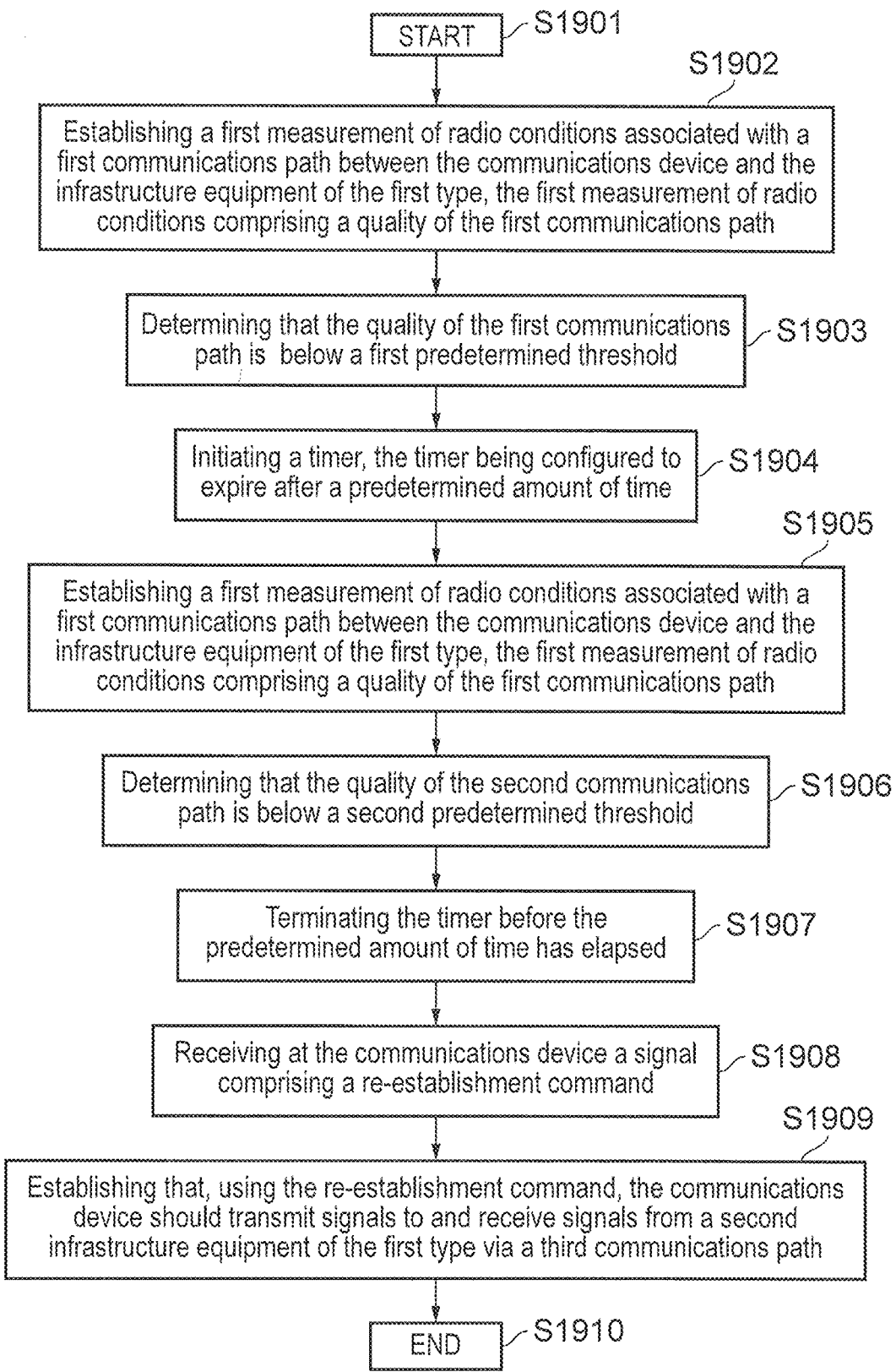
FIG. 19 shows a flow diagram illustrating a second process of communications between a UE, an LTE eNodeB and an NR Node B in accordance with embodiments of the present disclosure.

For each of the two aspects of the present disclosure—of Dual RRC-RLF Recovery and of Early Termination of RLF Timer—the flow diagrams displayed in FIGS. 18 and 19 may be used in combination with the following description in order to better understand the invention.

Each aspect relates to a method of communicating in a wireless telecommunications system comprising a communications device, a master cell group comprising one or more infrastructure equipment of a first type and a secondary cell group comprising one or more infrastructure equipment of a second type, the communications device being in a coverage area of one of the infrastructure equipment of the first type and a coverage area of at least one of the infrastructure equipment of the second type, wherein the communications device is configured to transmit signals to and receive signals from the infrastructure equipment of the first type in accordance with a first communications protocol and to transmit signals to and receive signals from the at least one infrastructure equipment of the second type in accordance with a second communications protocol, the second communications protocol being different to the first communications protocol.

FIG. 18 shows a flow diagram illustrating a first process of communications between a UE, an LTE eNodeB and an NR Node B in accordance with embodiments of the present disclosure. The process starts in step S1801. The method involves, in step S1802, establishing a measurement of radio conditions associated with a first communications path between the communications device and the infrastructure equipment of the first type, and in step S1803, determining that the first communications path is not appropriate for use by the communications device. Following this, in step S1804, the process comprises transmitting a failure message from the communications device to one of the infrastructure equipment of the second type via a second communications path, the failure message providing information regarding the determination that the first communications path is not appropriate for use by the communications device, in step S1805, receiving at the communications device a signal comprising a reconfiguration message from the one of the infrastructure equipment of the second type via the second communications path, and step S1806 involves establishing, using the reconfiguration message, signals to be transmitted by the communications device and signals to be received by the communications device. Finally, in step S1807, the process ends. FIG. 19 shows a flow diagram illustrating a second process of communications between a UE, an LTE eNodeB and an NR Node B in accordance with embodiments of the present disclosure. The process starts in step S1901. In step S1902, the method comprises establishing a first measurement of radio conditions associated with a first communications path between the communications device and the infrastructure equipment of the first type, the first measurement of radio conditions comprising a quality of the first communications path, while in step S1903, the method involves determining that the quality of the first communications path is below a first predetermined threshold. In step S1904, the process comprises initiating a timer, the timer being configured to expire after a predetermined amount of time. Step S1905 comprises establishing a second measurement of radio conditions associated with a second communications path between the communications device and one of the infrastructure equipment of the second type, the second measurement of radio conditions comprising a quality of the second communications path, while step S1906 involves determining that the quality of the second communications path is below a second predetermined threshold. The method further comprises, in step S1907, terminating the timer before the predetermined amount of time has elapsed, then in step S1908, receiving at the communications device a signal comprising a re-establishment command, and step S1909 comprises establishing that, using the re-establishment command, the communications device should transmit signals to and receive signals from a second infrastructure equipment of the first type via a third communications path. Finally, in step S1910, the process ends.

The following numbered paragraphs provide further example aspects and features of the present technique:

Paragraph 1. A method of communicating in a wireless telecommunications system comprising a communications device, a master cell group comprising one or more infrastructure equipment of a first type and a secondary cell group comprising one or more infrastructure equipment of a second type, the communications device being in a coverage area of one of the infrastructure equipment of the first type and a coverage area of at least one of the infrastructure equipment of the second type, wherein the communications device is configured to transmit signals to and receive signals from the infrastructure equipment of the first type in accordance with a first communications protocol and to transmit signals to and receive signals from the at least one infrastructure equipment of the second type in accordance with a second communications protocol, the second communications protocol being different to the first communications protocol, the method comprising
- establishing a measurement of radio conditions associated with a first communications path between the communications device and the infrastructure equipment of the first type,
- determining that the first communications path is not appropriate for use by the communications device,
- transmitting a failure message from the communications device to one of the infrastructure equipment of the second type via a second communications path, the failure message providing information regarding the determination that the first communications path is not appropriate for use by the communications device,
- receiving at the communications device a signal comprising a reconfiguration message from the one of the infrastructure equipment of the second type via the second communications path, and
- establishing, using the reconfiguration message, signals to be transmitted by the communications device and signals to be received by the communications device.

Paragraph 2. The method of paragraph 1, wherein the determining that the first communications path is not appropriate for use by the communications device comprises detecting from the measurement of radio conditions or an RLC unrecoverable error, radio link failure on the first communications path.

Paragraph 3. The method of paragraph 2, wherein the detecting radio link failure on the first communications path comprises detecting at the communications device a predetermined number of out-of-sync indications, the out-of-sync indications indicating that the communications device is unable to successfully decode signals received from the infrastructure equipment of the first type via the first communications path.

Paragraph 4. The method of paragraph 2 or 3, wherein the detecting radio link failure on the first communications path comprises the expiry of a timer, the timer being started upon detecting at the communications device an out-of-sync indication, the out-of-sync indication indicating that the communications device is unable to successfully decode signals received from the infrastructure equipment of the first type via the first communications path, wherein the timer is stopped before expiry if the communications device is able to successfully decode signals received from the infrastructure equipment of the first type via the first communications path.

Paragraph 5. The method of any preceding paragraph, wherein the determining that the first communications path is not appropriate for use by the communications device comprises determining that the communications device has not received a successful acknowledgement from the infrastructure equipment of the first type via the first communications path for a predetermined number of signals transmitted from the communications device to the infrastructure equipment of the first type via the first communications path.

Paragraph 6. The method of any preceding paragraph, wherein the determining that the first communications path is not appropriate for use by the communications device comprises the expiry of a timer, the timer being started upon transmitting by the communications device a handover command, wherein the timer is stopped before expiry if the communications device receives a successful acknowledgement in response to the handover command.

Paragraph 7. The method of any preceding paragraph, wherein the determining that the first communications path is not appropriate for use by the communications device comprises the expiry of a timer, the timer being started upon transmitting by the communications device a reconfiguration message, wherein the timer is stopped before expiry if the communications device receives a successful acknowledgement in response to the reconfiguration message.

Paragraph 8. The method of any preceding paragraph, wherein the determining that the first communications path is not appropriate for use by the communications device comprises detecting that the communications device is approaching an edge of the coverage area of the infrastructure equipment of the first type.

Paragraph 9. The method of any preceding paragraph, wherein the reconfiguration message comprises an indication that the one or more infrastructure equipment of the second type should become the master cell group and the one or more infrastructure equipment of the first type should become the secondary cell group.

Paragraph 10. The method of any preceding paragraph, wherein the reconfiguration message comprises an indication that the communications device should transmit signals to and receive signals from only the one or more infrastructure equipment of the second type.

Paragraph 11. The method of any preceding paragraph, further comprising the infrastructure equipment of the second type obtaining information from the infrastructure equipment of the first type to use for establishing reconfiguration information for the reconfiguration message.

Paragraph 12. A communications device for use in a wireless telecommunications system comprising a master cell group comprising one or more infrastructure equipment of a first type and a secondary cell group comprising one or more infrastructure equipment of a second type, the communications device being in a coverage area of one of the infrastructure equipment of the first type and a coverage area of at least one of the infrastructure equipment of the second type, the communications device comprising
- a transmitter configured to transmit signals to the infrastructure equipment of the first type via a first communications path in accordance with a first communications protocol and to transmit signals to the at least one infrastructure equipment of the second type via a second communications path in accordance with a second communications protocol, the second communications protocol being different to the first communications protocol, a receiver configured to receive signals from the infrastructure equipment of the first type via the first communications path in accordance with the first communications protocol and to receive signals from the at least one infrastructure equipment of the second type via the second communications path in accordance with the second communications protocol, and a controller configured to control the transmitter to transmit the signals and to control the receiver to receive the signals, wherein the controller is configured in combination with the transmitter and the receiver to establish a measurement of radio conditions associated with the first communications path, to determine that the first communications path is not appropriate for use by the communications device, to transmit a failure message to one of the infrastructure equipment of the second type via the second communications path, the failure message providing information regarding the determination that the first communications path is not appropriate for use by the communications device;

to receive a signal comprising a reconfiguration message from the one of the infrastructure equipment of the second type via the second communications path; and to establish, using the reconfiguration message, signals to be transmitted by the transmitter and signals to be received by the receiver.

Paragraph 13. The communications device of paragraph 12, wherein the determining that the first communications path is not appropriate for use by the communications device comprises detecting, from the measurement of radio conditions, radio link failure on the first communications path.

Paragraph 14. The communications device of paragraph 13, wherein the detecting radio link failure on the first communications path comprises detecting by the communications device a predetermined number of out-of-sync indications, the out-of-sync indications indicating that the communications device is unable to successfully decode signals received from the infrastructure equipment of the first type via the first communications path.

Paragraph 15. The communications device of paragraph 13 or 14, wherein the detecting radio link failure on the first communications path comprises the expiry of a timer, the timer being started upon detecting by the communications device an out-of-sync indication, the out-of-sync indication indicating that the communications device is unable to successfully decode signals received from the infrastructure equipment of the first type via the first communications path, wherein the timer is stopped before expiry if the communications device is able to successfully decode signals received from the infrastructure equipment of the first type via the first communications path.

Paragraph 16. The communications device of any of paragraphs 12 to 15, wherein the determining that the first communications path is not appropriate for use by the communications device comprises determining by the communications device that the receiver has not received a successful acknowledgement from the infrastructure equipment of the first type via the first communications path for a predetermined number of signals transmitted from the transmitter to the infrastructure equipment of the first type via the first communications path.

Paragraph 17. The communications device of any of paragraphs 12 to 16, wherein the determining that the first communications path is not appropriate for use by the communications device comprises the expiry of a timer, the timer being started upon transmitting by the communications device a handover command, wherein the timer is stopped before expiry if the communications device receives a successful acknowledgement in response to the handover command.

Paragraph 18. The communications device of any of paragraphs 12 to 17, wherein the determining that the first communications path is not appropriate for use by the communications device comprises the expiry of a timer, the timer being started upon transmitting by the communications device a reconfiguration message, wherein the timer is stopped before expiry if the communications device receives a successful acknowledgement in response to the reconfiguration message.

Paragraph 19. The communications device of any of paragraphs 12 to 18, wherein the determining that the first communications path is not appropriate for use by the communications device comprises detecting by the communications device that the communications device is approaching an edge of the coverage area of the infrastructure equipment of the first type.

Paragraph 20. The communications device of any of paragraphs 12 to 19, wherein the reconfiguration message comprises an indication that the one or more infrastructure equipment of the second type should become the master cell group and the one or more infrastructure equipment of the first type should become the secondary cell group.

Paragraph 21. The communications device of any of paragraphs 12 to 20, wherein the reconfiguration message comprises an indication that the communications device should transmit signals to and receive signals from only the one or more infrastructure equipment of the second type.

Paragraph 22. Circuitry for a communications device for use in a wireless telecommunications system comprising a master cell group comprising one or more infrastructure equipment of a first type and a secondary cell group comprising one or more infrastructure equipment of a second type, the communications device being in a coverage area of one of the infrastructure equipment of the first type and a coverage area of at least one of the infrastructure equipment of the second type, the communications device comprising a transmitter configured to transmit signals to the infrastructure equipment of the first type via a first communications path in accordance with a first communications protocol and to transmit signals to the at least one infrastructure equipment of the second type via a second communications path in accordance with a second communications protocol, the second communications protocol being different to the first communications protocol, a receiver configured to receive signals from the infrastructure equipment of the first type via the first communications path in accordance with the first communications protocol and to receive signals from the at least one infrastructure equipment of the second type via the second communications path in accordance with the second communications protocol, and a controller configured to control the transmitter to transmit the signals and to control the receiver to receive the signals, wherein the controller is configured in combination with the transmitter and the receiver to establish a measurement of radio conditions associated with the first communications path, to determine that the first communications path is not appropriate for use by the communications device, to transmit a failure message to one of the infrastructure equipment of the second type via the second communications path, the failure message providing information regarding the determination that the first communications path is not appropriate for use by the communications device;

to receive a signal comprising a reconfiguration message from the one of the infrastructure equipment of the second type via the second communications path; and to establish, using the reconfiguration message, signals to be transmitted by the transmitter and signals to be received by the receiver.

Paragraph 23. An infrastructure equipment of a second type forming part of a wireless telecommunications system comprising one or more communications devices, a master cell group comprising one or more infrastructure equipment of a first type and a secondary cell group comprising one or more infrastructure equipment of the second type, one of the communications devices being in a coverage area of one of the infrastructure equipment of the first type and a coverage area of the infrastructure equipment of the second type, the infrastructure equipment of the second type comprising a transmitter configured to transmit signals to the communications device via a second communications path, a receiver configured to receive signals from the communications device via the second communications path, and a controller configured to control the transmitter to transmit the signals and to control the receiver to receive the signals, wherein the controller is configured in combination with the transmitter and the receiver to receive a failure message from the communications device, the failure message providing information regarding a determination by the communications device using a measurement of radio conditions associated with a first communications path between the communications device and the infrastructure equipment of the first type that the first communications path is not appropriate for use by the communications device, and to transmit a signal comprising a reconfiguration message to the communications device via the second communications path, wherein the reconfiguration message comprises at least one of an indication that the one or more infrastructure equipment of the second type should become the master cell group and the one or more infrastructure equipment of the first type should become the secondary cell group, and an indication that the communications device should transmit signals to and receive signals from only the one or more infrastructure equipment of the second type.

Paragraph 24. Circuitry for an infrastructure equipment of a second type forming part of a wireless telecommunications system comprising one or more communications devices, a master cell group comprising one or more infrastructure equipment of a first type and a secondary cell group comprising one or more infrastructure equipment of the second type, one of the communications devices being in a coverage area of one of the infrastructure equipment of the first type and a coverage area of the infrastructure equipment of the second type, the infrastructure equipment of the second type comprising a transmitter configured to transmit signals to the communications device via a second communications path, a receiver configured to receive signals from the communications device via the second communications path, and a controller configured to control the transmitter to transmit the signals and to control the receiver to receive the signals, wherein the controller is configured in combination with the transmitter and the receiver to receive a failure message from the communications device, the failure message providing information regarding a determination by the communications device using a measurement of radio conditions associated with a first communications path between the communications device and the infrastructure equipment of the first type that the first communications path is not appropriate for use by the communications device, and to transmit a signal comprising a reconfiguration message to the communications device via the second communications path, wherein the reconfiguration message comprises at least one of an indication that the one or more infrastructure equipment of the second type should become the master cell group and the one or more infrastructure equipment of the first type should become the secondary cell group, and an indication that the communications device should transmit signals to and receive signals from only the one or more infrastructure equipment of the second type.

Paragraph 25. A method of communicating in a wireless telecommunications system comprising a communications device, a master cell group comprising a plurality of infrastructure equipment of a first type and a secondary cell group comprising one or more infrastructure equipment of a second type, the communications device being in a coverage area of one of the infrastructure equipment of the first type and a coverage area of at least one of the infrastructure equipment of the second type, wherein the communications device is configured to transmit signals to and receive signals from the infrastructure equipment of the first type in accordance with a first communications protocol and to transmit signals to and receive signals from the at least one infrastructure equipment of the second type in accordance with a second communications protocol, the second communications protocol being different to the first communications protocol, the method comprising establishing a first measurement of radio conditions associated with a first communications path between the communications device and the infrastructure equipment of the first type, the first measurement of radio conditions comprising a quality of the first communications path, determining that the quality of the first communications path is below a first predetermined threshold, initiating a timer, the timer being configured to expire after a predetermined amount of time, establishing a second measurement of radio conditions associated with a second communications path between the communications device and one of the infrastructure equipment of the second type, the second measurement of radio conditions comprising a quality of the second communications path, determining that the quality of the second communications path is below a second predetermined threshold,
terminating the timer before the predetermined amount of time has elapsed,
receiving at the communications device a signal comprising a re-establishment command, and
establishing that, using the re-establishment command, the communications device should transmit signals to and receive signals from a second infrastructure equipment of the first type via a third communications path.

Paragraph 26. A communications device for use in a wireless telecommunications system comprising a master cell group comprising a plurality of infrastructure equipment of a first type and a secondary cell group comprising one or more infrastructure equipment of a second type, the communications device being in a coverage area of one of the infrastructure equipment of the first type and a coverage area of at least one of the infrastructure equipment of the second type, the communications device comprising a transmitter configured to transmit signals to the infrastructure equipment of the first type via a first communications path in accordance with a first communications protocol and to transmit signals to the at least one infrastructure equipment of the second type via a second communications path in accordance with a second communications protocol, the second communications protocol being different to the first communications protocol, a receiver configured to receive signals from the infrastructure equipment of the first type via the first communications path in accordance with the first communications protocol and to receive signals from the at least one infrastructure equipment of the second type via the second communications path in accordance with the second communications protocol, and a controller configured to control the transmitter to transmit the signals and to control the receiver to receive the signals, wherein the controller is configured in combination with the receiver to receive from the infrastructure equipment of the first type an indication of a first measurement of radio conditions associated with the first communications path, the first measurement of radio conditions comprising a quality of the first communications path, to determine that the quality of the first communications path is below a first predetermined threshold, to initiate a timer, the timer being configured to expire after a predetermined amount of time, to receive from the infrastructure equipment of the second type an indication of a second measurement of radio conditions associated with the second communications path, the second measurement of radio conditions comprising a quality of the second communications path, to determine that the quality of the second communications path is below a second predetermined threshold, to terminate the timer before the predetermined amount of time has elapsed, to receive a signal comprising a re-establishment command, and to establish that, using the re-establishment command, the transmitter should transmit signals to and the receiver should receive signals from a second infrastructure equipment of the first type via a third communications path.

Paragraph 27. Circuitry for a communications device for use in a wireless telecommunications system comprising a master cell group comprising a plurality of infrastructure equipment of a first type and a secondary cell group comprising one or more infrastructure equipment of a second type, the communications device being in a coverage area of one of the infrastructure equipment of the first type and a coverage area of at least one of the infrastructure equipment of the second type, the communications device comprising a transmitter configured to transmit signals to the infrastructure equipment of the first type via a first communications path in accordance with a first communications protocol and to transmit signals to the at least one infrastructure equipment of the second type via a second communications path in accordance with a second communications protocol, the second communications protocol being different to the first communications protocol, a receiver configured to receive signals from the infrastructure equipment of the first type via the first communications path in accordance with the first communications protocol and to receive signals from the at least one infrastructure equipment of the second type via the second communications path in accordance with the second communications protocol, and a controller configured to control the transmitter to transmit the signals and to control the receiver to receive the signals, wherein the controller is configured in combination with the receiver to receive from the infrastructure equipment of the first type an indication of a first measurement of radio conditions associated with the first communications path, the first measurement of radio conditions comprising a quality of the first communications path, to determine that the quality of the first communications path is below a first predetermined threshold, to initiate a timer, the timer being configured to expire after a predetermined amount of time, to receive from the infrastructure equipment of the second type an indication of a second measurement of radio conditions associated with the second communications path, the second measurement of radio conditions comprising a quality of the second communications path, to determine that the quality of the second communications path is below a second predetermined threshold, to terminate the timer before the predetermined amount of time has elapsed, to receive a signal comprising a re-establishment command, and to establish that, using the re-establishment command, the transmitter should transmit signals to and the receiver should receive signals from a second infrastructure equipment of the first type via a third communications path.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] LTE for UMTS: OFDMA and SC-FDMA Based Radio Access, Harris Holma and Antti Toskala, Wiley 2009, ISBN 978-0-470-99401-6.
[2] R2-162965, "RAN interworking between NR and LTE," KT Corp., RAN2 #93bis.
[3] R2-162753, "Tight integration of the New Radio interface (NR) and LTE: Control Plane design," Ericsson, RAN2 #93bis.
[4] 3GPP TR 36.842, "$3^{rd}$ Generation Partnership project; Technical Specification Group Radio Access Network; Evolved Universal Terrestrial Radio Access (E-UTRA); Study on Small Cell Enhancements for E-UTRA and E-UTRAN—Higher layer aspects (Release 12)," November 2013.
[5] R2-132469, "Performance of Control Plane Diversity," MediaTrek Inc., RAN2 #83.
[6] 3GPP TS 36.300 V8.12.0, "$3^{rd}$ Generation Partnership project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," March 2010.
[7] R2-131663, "RLF recovery enhancements," Qualcomm Incorporated, RAN2 #82.

What is claimed is:

1. An infrastructure equipment of a second type forming part of a wireless telecommunications system comprising one or more communications devices, a master cell group comprising one or more infrastructure equipment of a first type and a secondary cell group comprising one or more infrastructure equipment of the second type, one of the communications devices being in a coverage area of one of the infrastructure equipment of the first type and a coverage area of the infrastructure equipment of the second type, the infrastructure equipment of the second type comprising:

a transmitter that transmits signals to the communications device via a second communications path;
a receiver that receives signals from the communications device via the second communications path; and
a control circuit that controls the transmitter to transmit the signals and controls the receiver to receive the signals, and the control circuit in combination with the transmitter and the receiver;
receives a failure message from the communications device, the failure message providing information regarding a determination by the communications device using a measurement of radio conditions associated with a first communications path between the communications device and the infrastructure equipment of the first type that the first communications path is not appropriate for use by the communications device; and
transmits a signal comprising a reconfiguration message to the communications device via the second communications path, wherein
the reconfiguration message comprises at least one of
an indication that the one or more infrastructure equipment of the second type should become the master cell group and the one or more infrastructure equipment of the first type should become the secondary cell group, and
an indication that the communications device should transmit signals to and receive signals from only the one or more infrastructure equipment of the second type.

2. The infrastructure equipment of the second type according to claim 1, wherein the first communications path is determined to be not appropriate for use by the communications device based on a detection, from the measurement of radio conditions, of radio link failure on the first communications path.

3. The infrastructure equipment of the second type according to claim 1, wherein
the failure message comprises an expiry of a timer, the timer having been started upon detecting, at the communications device, an out-of-sync indication,
the out-of-sync indication indicates that the communications device is unable to successfully decode signals received from the infrastructure equipment of the first type via the first communications path, and
the timer is stopped before expiry in a case that the communications device is able to successfully decode signals received from the infrastructure equipment of the first type via the first communications path.

4. The infrastructure equipment of the second type according to claim 2, wherein the detection is based on detecting, at the communications device, a predetermined number of out-of-sync indications, the out-of-sync indications indicating that the communications device is unable to successfully decode signals received from the infrastructure equipment of the first type via the first communications path.

5. The infrastructure equipment of the second type according to claim 1, wherein the control circuit further obtains information from the infrastructure equipment of the first type to use for establishing reconfiguration information for the reconfiguration message.

6. Circuitry for an infrastructure equipment of a second type forming part of a wireless telecommunications system comprising one or more communications devices, a master cell group comprising one or more infrastructure equipment of a first type and a secondary cell group comprising one or more infrastructure equipment of the second type, one of the communications devices being in a coverage area of one of the infrastructure equipment of the first type and a coverage area of the infrastructure equipment of the second type, the infrastructure equipment of the second type comprising:

a transmitter that transmits signals to the communications device via a second communications path;
a receiver that receives signals from the communications device via the second communications path; and
a control circuit that controls the transmitter to transmit the signals and controls the receiver to receive the signals, and the control circuit in combination with the transmitter and the receiver:
receives a failure message from the communications device, the failure message providing information regarding a determination by the communications device using a measurement of radio conditions associated with a first communications path between the communications device and the infrastructure equipment of the first type that the first communications path is not appropriate for use by the communications device; and
transmits a signal comprising a reconfiguration message to the communications device via the second communications path, wherein
the reconfiguration message comprises at least one of
an indication that the one or more infrastructure equipment of the second type should become the master cell group and the one or more infrastructure equipment of the first type should become the secondary cell group, and
an indication that the communications device should transmit signals to and receive signals from only the one or more infrastructure equipment of the second type.

7. The circuitry according to claim 6, wherein the first communications path is determined to be not appropriate for use by the communications device based on a detection, from the measurement of radio conditions, of radio link failure on the first communications path.

8. The circuitry according to claim 6, wherein the failure message comprises an expiry of a timer, the timer having been started upon detecting, at the communications device, an out-of-sync indication,
the out-of-sync indication indicates that the communications device is unable to successfully decode signals received from the infrastructure equipment of the first type via the first communications path, and
the timer is stopped before expiry in a case that the communications device is able to successfully decode signals received from the infrastructure equipment of the first type via the first communications path.

9. The circuitry according to claim 7, wherein the detection is based on detecting, at the communications device, a predetermined number of out-of-sync indications, the out-of-sync indications indicating that the communications device is unable to successfully decode signals received from the infrastructure equipment of the first type via the first communications path.

10. The circuitry according to claim 6, wherein the control circuit further obtains information from the infrastructure equipment of the first type to use for establishing reconfiguration information for the reconfiguration message.

11. Circuitry for a communications device for use in a wireless telecommunications system comprising a master cell group comprising a plurality of infrastructure equipment of a first type and a secondary cell group comprising one or more infrastructure equipment of a second type, the communications device being in a coverage area of one of the infrastructure equipment of the first type and a coverage area of at least one of the infrastructure equipment of the second type, the communications device comprising:
a transmitter that transmits signals to the infrastructure equipment of the first type via a first communications path in accordance with a first communications protocol and to transmit signals to the at least one infrastructure equipment of the second type via a second communications path in accordance with a second communications protocol, the second communications protocol being different to the first communications protocol;
a receiver that receives signals from the infrastructure equipment of the first type via the first communications path in accordance with the first communications protocol and to receive signals from the at least one infrastructure equipment of the second type via the second communications path in accordance with the second communications protocol; and
a control circuit that controls the transmitter to transmit the signals and controls the receiver to receive the signals, and the control circuit in combination with the receiver:
receives, from the infrastructure equipment of the first type, an indication of a first measurement of radio conditions associated with the first communications path, the first measurement of radio conditions comprising a quality of the first communications path;
determines that the quality of the first communications path is below a first predetermined threshold;
initiates a timer, the timer being configured to expire after a predetermined amount of time;
receives from the infrastructure equipment of the second type an indication of a second measurement of radio conditions associated with the second communications path, the second measurement of radio conditions comprising a quality of the second communications path;
determines that the quality of the second communications path is below a second predetermined threshold;
terminates the timer before the predetermined amount of time has elapsed;
receives a signal comprising a re-establishment command; and
establishes that, using the re-establishment command, the transmitter should transmit signals to and the receiver should receive signals from a second infrastructure equipment of the first type via a third communications path.

* * * * *